United States Patent
Akanishi et al.

(10) Patent No.: US 11,292,555 B2
(45) Date of Patent: Apr. 5, 2022

(54) BICYCLE SPROCKET

(71) Applicant: SHIMANO INC., Sakai (JP)

(72) Inventors: Kenichi Akanishi, Sakai (JP); Atsuhiro Emura, Sakai (JP); Shingo Shiraishi, Sakai (JP)

(73) Assignee: SHIMANO INC., Sakai (JP)

( * ) Notice: Subject to any disclaimer, the term of this patent is extended or adjusted under 35 U.S.C. 154(b) by 701 days.

(21) Appl. No.: 16/052,561

(22) Filed: Aug. 1, 2018

(65) Prior Publication Data
US 2020/0040979 A1 Feb. 6, 2020

(51) Int. Cl.
| | |
|---|---|
| *B62M 9/00* | (2006.01) |
| *B62M 9/06* | (2006.01) |
| *B62M 9/10* | (2006.01) |
| *B62M 9/04* | (2006.01) |
| *F16H 55/12* | (2006.01) |
| *F16H 55/30* | (2006.01) |

(52) U.S. Cl.
CPC .............. *B62M 9/105* (2013.01); *B62M 9/00* (2013.01); *B62M 9/06* (2013.01); *F16H 55/12* (2013.01); *F16H 55/30* (2013.01)

(58) Field of Classification Search
CPC .......... B62M 9/00; B62M 9/10; B62M 9/105; B62M 9/12; F16H 55/30; F16H 55/12
See application file for complete search history.

(56) References Cited

U.S. PATENT DOCUMENTS

| | | | | |
|---|---|---|---|---|
| 4,988,328 A * | 1/1991 | Iwasaki | .................. | B62M 9/105 474/160 |
| 5,480,359 A * | 1/1996 | Tani | ...................... | B62M 9/105 474/160 |
| 5,766,106 A * | 6/1998 | Edwards | ................ | B62M 9/105 474/160 |
| 5,791,203 A * | 8/1998 | Chen | ...................... | B62M 9/105 74/594.1 |
| 7,686,721 B2 * | 3/2010 | Tabe | ...................... | B62M 9/105 474/152 |

(Continued)

FOREIGN PATENT DOCUMENTS

| | | |
|---|---|---|
| CN | 1076685 C | 12/2001 |
| CN | 103419893 | 12/2013 |

(Continued)

*Primary Examiner* — Michael R Mansen
*Assistant Examiner* — Raveen J Dias
(74) *Attorney, Agent, or Firm* — Mori & Ward, LLP

(57) ABSTRACT

A bicycle sprocket comprises a sprocket body, a plurality of sprocket teeth, a mounting member, at least one fastening member, and a cover member. The sprocket body has at least one first threaded portion. The mounting member has at least one fastening hole configured to be aligned with the at least one first threaded portion in the assembled state. The at least one fastening member has a fastening shaft portion, a fastening head portion, and a second threaded portion. The second threaded portion is configured to threadedly engage with the at least one first threaded portion of the sprocket body in the assembled state. The cover member is configured to at least cover the fastening shaft portion of the at least one fastening member when viewed from an axial direction with respect to the rotational center axis in the assembled state.

28 Claims, 18 Drawing Sheets

(56) References Cited

U.S. PATENT DOCUMENTS

| | | | |
|---|---|---|---|
| 7,824,287 B2 * | 11/2010 | Nonoshita | B62M 9/10 474/161 |
| 9,771,128 B2 | 9/2017 | Sugimoto et al. | |
| 2003/0153423 A1 * | 8/2003 | Smith | B62M 9/10 474/160 |
| 2005/0032596 A1 * | 2/2005 | Nonoshita | B62K 19/16 474/175 |
| 2005/0282672 A1 * | 12/2005 | Nonoshita | B62M 9/105 474/161 |
| 2006/0094550 A1 * | 5/2006 | Tetsuka | B62M 3/00 474/160 |
| 2006/0205549 A1 * | 9/2006 | Nonoshita | B62M 9/105 474/160 |
| 2007/0129193 A1 * | 6/2007 | Nonoshita | B62M 9/105 474/160 |
| 2008/0028887 A1 * | 2/2008 | Valle | B62M 9/105 74/594.1 |
| 2008/0161145 A1 * | 7/2008 | Shiraishi | B62J 13/00 474/145 |
| 2008/0161146 A1 * | 7/2008 | Shiraishi | B62M 9/12 474/160 |
| 2009/0111631 A1 * | 4/2009 | Wickliffe | B62M 9/12 474/152 |
| 2010/0050810 A1 * | 3/2010 | Nakatani | B62M 9/105 74/594.2 |
| 2012/0042746 A1 * | 2/2012 | Nonoshita | B62M 3/003 74/594.2 |
| 2013/0087012 A1 * | 4/2013 | Sugimoto | B62M 9/105 74/594.2 |
| 2014/0338494 A1 | 11/2014 | Sugimoto et al. | |
| 2015/0226307 A1 * | 8/2015 | Pfeiffer | B62M 9/105 474/152 |
| 2015/0291255 A1 * | 10/2015 | Nishimoto | B62M 9/06 474/152 |
| 2016/0238122 A1 * | 8/2016 | Medaglia | B62M 9/00 |
| 2016/0280325 A1 * | 9/2016 | Watarai | B62M 9/105 |
| 2017/0146109 A1 * | 5/2017 | Reiter | B62M 9/105 |
| 2017/0167542 A1 * | 6/2017 | Hara | F16H 55/30 |
| 2017/0247081 A1 * | 8/2017 | Sugimoto | F16H 55/30 |
| 2017/0292598 A1 | 10/2017 | Moore et al. | |
| 2018/0079467 A1 * | 3/2018 | Hirose | B62M 9/105 |
| 2018/0112764 A1 * | 4/2018 | Sugimoto | B62M 1/36 |
| 2018/0141615 A1 * | 5/2018 | Sugimoto | B62M 9/12 |
| 2018/0180157 A1 * | 6/2018 | Akanishi | B62M 9/12 |
| 2018/0290712 A1 * | 10/2018 | Taniguchi | F16H 55/30 |
| 2018/0347680 A1 * | 12/2018 | Akanishi | F16H 55/30 |
| 2018/0363752 A1 * | 12/2018 | Chin | F16H 55/30 |
| 2019/0185108 A1 * | 6/2019 | Bush | F16H 55/30 |
| 2019/0277386 A1 * | 9/2019 | Hirose | F16H 55/06 |
| 2019/0291818 A1 * | 9/2019 | Braedt | B62K 25/02 |
| 2020/0063850 A1 * | 2/2020 | Tavares Miranda | B62M 9/105 |

FOREIGN PATENT DOCUMENTS

| | | |
|---|---|---|
| CN | 104163227 | 11/2014 |
| CN | 106314670 | 1/2017 |
| EP | 0791532 | 8/1997 |
| JP | 54-140446 U1 | 9/1979 |

* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular faun of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body, a plurality of sprocket teeth, a mounting member, at least one fastening member, and a cover member. The sprocket body has at least one first threaded portion. The plurality of sprocket teeth extends radially outwardly from the sprocket body with respect to a rotational center axis of the bicycle sprocket. The mounting member is configured to support the sprocket body in an assembled state of the bicycle sprocket and being a separate member from a crank atm. The mounting member has at least one fastening hole configured to be aligned with the at least one first threaded portion in the assembled state. The at least one fastening member has a fastening shaft portion, a fastening head portion, and a second threaded portion. The fastening shaft portion is configured to extend through the at least one fastening hole of the mounting member in the assembled state. The fastening head portion is attached to one end of the fastening shaft portion. The second threaded portion is provided to the fastening shaft portion. The second threaded portion is configured to threadedly engage with the at least one first threaded portion of the sprocket body in the assembled state. The cover member is configured to at least cover the fastening shaft portion of the at least one fastening member when viewed from an axial direction with respect to the rotational center axis in the assembled state.

With the bicycle sprocket according to the first aspect, it is possible to save a weight of the bicycle sprocket with improving appearance of the bicycle sprocket.

In accordance with a second aspect of the present invention, the bicycle sprocket according to the first aspect is configured so that the at least one first threaded portion includes an internal threaded portion.

With the bicycle sprocket according to the second aspect, it is possible to save the weight of the bicycle sprocket with improving appearance of the bicycle sprocket.

In accordance with a third aspect of the present invention, the bicycle sprocket according to the second aspect is configured so that the second threaded portion includes an external threaded portion.

With the bicycle sprocket according to the third aspect, it is possible to save the weight of the bicycle sprocket with improving appearance of the bicycle sprocket.

In accordance with a fourth aspect of the present invention, the bicycle sprocket according to any one of the first to third aspects is configured so that the cover member is attached to the sprocket body.

With the bicycle sprocket according to the fourth aspect, it is possible to save the weight of the bicycle sprocket with improving appearance of the bicycle sprocket.

In accordance with a fifth aspect of the present invention, the bicycle sprocket according to the fourth aspect is configured so that the cover member is attached to the sprocket body with one of integral molding and adhesive.

With the bicycle sprocket according to the fifth aspect, it is possible to improve productivity of the bicycle sprocket.

In accordance with a sixth aspect of the present invention, the bicycle sprocket according to any one of the first to fifth aspects is configured so that the cover member is made of a non-metallic material including resin.

With the bicycle sprocket according to the sixth aspect, it is possible to further save the weight of the bicycle sprocket.

In accordance with a seventh aspect of the present invention, the bicycle sprocket according to any one of the first to sixth aspects is configured so that the mounting member has a hub portion and at least one mounting arm extending radially outwardly from the hub portion with respect to the rotational center axis.

With the bicycle sprocket according to the seventh aspect, it is possible to further save the weight of the bicycle sprocket.

In accordance with an eighth aspect of the present invention, the bicycle sprocket according to the seventh aspect is configured so that the at least one mounting arm includes a plurality of mounting arms.

With the bicycle sprocket according to the eighth aspect, it is possible to certainly support the sprocket body by the mounting member.

In accordance with a ninth aspect of the present invention, the bicycle sprocket according to the seventh aspect is configured so that the at least one mounting arm has at least one mounting portion provided to a distal end of the at least one mounting atm. The at least one fastening hole is provided to the at least one mounting portion.

With the bicycle sprocket according to the ninth aspect, it is possible to further save the weight of the bicycle sprocket.

In accordance with a tenth aspect of the present invention, the bicycle sprocket according to the ninth aspect is configured so that a total number of the at least one mounting portion is larger than a total number of the at least one mounting arm.

With the bicycle sprocket according to the tenth aspect, it is possible to certainly support the sprocket body by the mounting member.

In accordance with an eleventh aspect of the present invention, the bicycle sprocket according to the tenth aspect is configured so that the total number of the at least one mounting portion is double of the total number of the at least one mounting arm.

With the bicycle sprocket according to the eleventh aspect, it is possible to certainly support the sprocket body by the mounting member.

In accordance with a twelfth aspect of the present invention, the bicycle sprocket according to any one of the seventh to eleventh aspects is configured so that the at least one mounting arm has a radially extending centerline extending radially outwardly from the rotational center axis. The at least one fastening hole is offset from the radially extending centerline of the at least one mounting arm in a circumferential direction with respect to the rotational center axis when viewed along the rotational center axis.

With the bicycle sprocket according to the twelfth aspect, it is possible to certainly support the sprocket body by the mounting member.

In accordance with a thirteenth aspect of the present invention, the bicycle sprocket according to the twelfth aspect is configured so that the at least one fastening hole includes a plurality of fastening holes. The plurality of fastening holes is disposed both sides of the radially extending centerline in the circumferential direction.

With the bicycle sprocket according to the thirteenth aspect, it is possible to certainly support the sprocket body by the mounting member.

In accordance with a fourteenth aspect of the present invention, the bicycle sprocket according to any one of the seventh to thirteenth aspects is configured so that the hub portion of the mounting member has a central opening.

With the bicycle sprocket according to the fourteenth aspect, it is possible to further save the weight of the bicycle sprocket.

In accordance with a fifteenth aspect of the present invention, the bicycle sprocket according to the fourteenth aspect is configured so that the hub portion of the mounting member includes a torque transmitting profile provided to the central opening.

With the bicycle sprocket according to the fifteenth aspect, it is possible to certainly transmit a rotational force with a lighter structure.

In accordance with a sixteenth aspect of the present invention, the bicycle sprocket according to the fifteenth aspect is configured so that the torque transmitting profile includes at least one spline tooth.

With the bicycle sprocket according to the sixteenth aspect, it is possible to certainly transmit a rotational force with a lighter structure.

In accordance with a seventeenth aspect of the present invention, the bicycle sprocket according to the fifteenth or sixteenth aspect is configured so that the torque transmitting profile is configured to transmit pedaling torque between the bicycle sprocket and one of a crank arm and a crank axle.

With the bicycle sprocket according to the seventeenth aspect, it is possible to certainly transmit a rotational force with a lighter structure.

In accordance with an eighteenth aspect of the present invention, the bicycle sprocket according to any one of the first to seventeenth aspects is configured so that the plurality of sprocket teeth includes at least one first tooth having a first chain-engaging axial width with respect to the rotational center axis and at least one second tooth having a second chain-engaging axial width with respect to the rotational center axis. The first chain-engaging axial width is larger than the second chain-engaging axial width in the axial direction.

With the bicycle sprocket according to the eighteenth aspect, it is possible to improve chain-holding performance of the bicycle sprocket.

In accordance with a nineteenth aspect of the present invention, the bicycle sprocket according to the eighteenth aspect is configured so that the first chain-engaging axial width is larger than an inner link axial space defined between an opposed pair of inner link plates of a bicycle chain in the axial direction and is smaller than an outer link axial space defined between an opposed pair of outer link plates of the bicycle chain in the axial direction. The second chain-engaging axial width is smaller than the inner link axial space.

With the bicycle sprocket according to the nineteenth aspect, it is possible to improve chain-holding performance of the bicycle sprocket.

In accordance with a twentieth aspect of the present invention, the bicycle sprocket according to the eighteenth or nineteenth aspect is configured so that a first radial length is defined between a first radially outermost tooth-tip of the at least one first tooth and the rotational center axis in a radial direction with respect to the rotational center axis. A second radial length is defined between a second radially outermost tooth-tip of the at least one second tooth and the rotational center axis in the radial direction. The first radial length is larger than the second radial length.

With the bicycle sprocket according to the twentieth aspect, it is possible to improve chain-holding performance of the bicycle sprocket.

In accordance with a twenty-first aspect of the present invention, the bicycle sprocket according to the nineteenth aspect is configured so that the first chain-engaging axial width of the at least one first tooth is equal to or larger than 75% of the outer link axial space.

With the bicycle sprocket according to the twenty-first aspect, it is possible to improve chain-holding performance of the bicycle sprocket.

In accordance with a twenty-second aspect of the present invention, the bicycle sprocket according to any one of the eighteenth to twenty-first aspects is configured so that the at least one first tooth has a first radially outermost tooth-tip having a first axial tooth-center that is offset from a first axial tooth center plane of the at least one first tooth.

With the bicycle sprocket according to the twenty-second aspect, it is possible to improve chain-holding performance of the bicycle sprocket in a state where the bicycle chain is inclined relative to a sprocket.

In accordance with a twenty-third aspect of the present invention, the bicycle sprocket according to any one of the eighteenth to twenty-second aspects is configured so that the at least one second tooth has a second radially outermost tooth-tip having a second axial tooth-center that is offset from a second axial tooth center plane of the at least one second tooth.

With the bicycle sprocket according to the twenty-third aspect, it is possible to improve chain-holding performance of the bicycle sprocket in a state where the bicycle chain is inclined relative to a sprocket.

In accordance with a twenty-fourth aspect of the present invention, the bicycle sprocket according to any one of the eighteenth to twenty-third aspects is configured so that the at least one first tooth is asymmetric with respect to a first circumferential tooth center plane in a circumferential direction with respect to the rotational center axis.

With the bicycle sprocket according to the twenty-fourth aspect, it is possible to improve chain-holding performance of the bicycle sprocket.

In accordance with a twenty-fifth aspect of the present invention, the bicycle sprocket according to any one of the eighteenth to twenty-fourth aspects is configured so that the at least one first tooth is asymmetric with respect to a first axial tooth center plane in the axial direction.

With the bicycle sprocket according to the twenty-fifth aspect, it is possible to improve chain-holding performance of the bicycle sprocket.

In accordance with a twenty-sixth aspect of the present invention, the bicycle sprocket according to any one of the eighteenth to twenty-third and twenty-fifth aspects is configured so that the at least one first tooth is symmetric with respect to a first circumferential tooth center plane in a circumferential direction with respect to the rotational center axis.

With the bicycle sprocket according to the twenty-sixth aspect, it is possible to improve chain-holding performance of the bicycle sprocket.

In accordance with a twenty-seventh aspect of the present invention, the bicycle sprocket according to any one of the eighteenth to twenty-fourth and twenty-sixth aspects is configured so that the at least one first tooth is symmetric with respect to a first axial tooth center plane in the axial direction.

With the bicycle sprocket according to the twenty-seventh aspect, it is possible to improve chain-holding performance of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
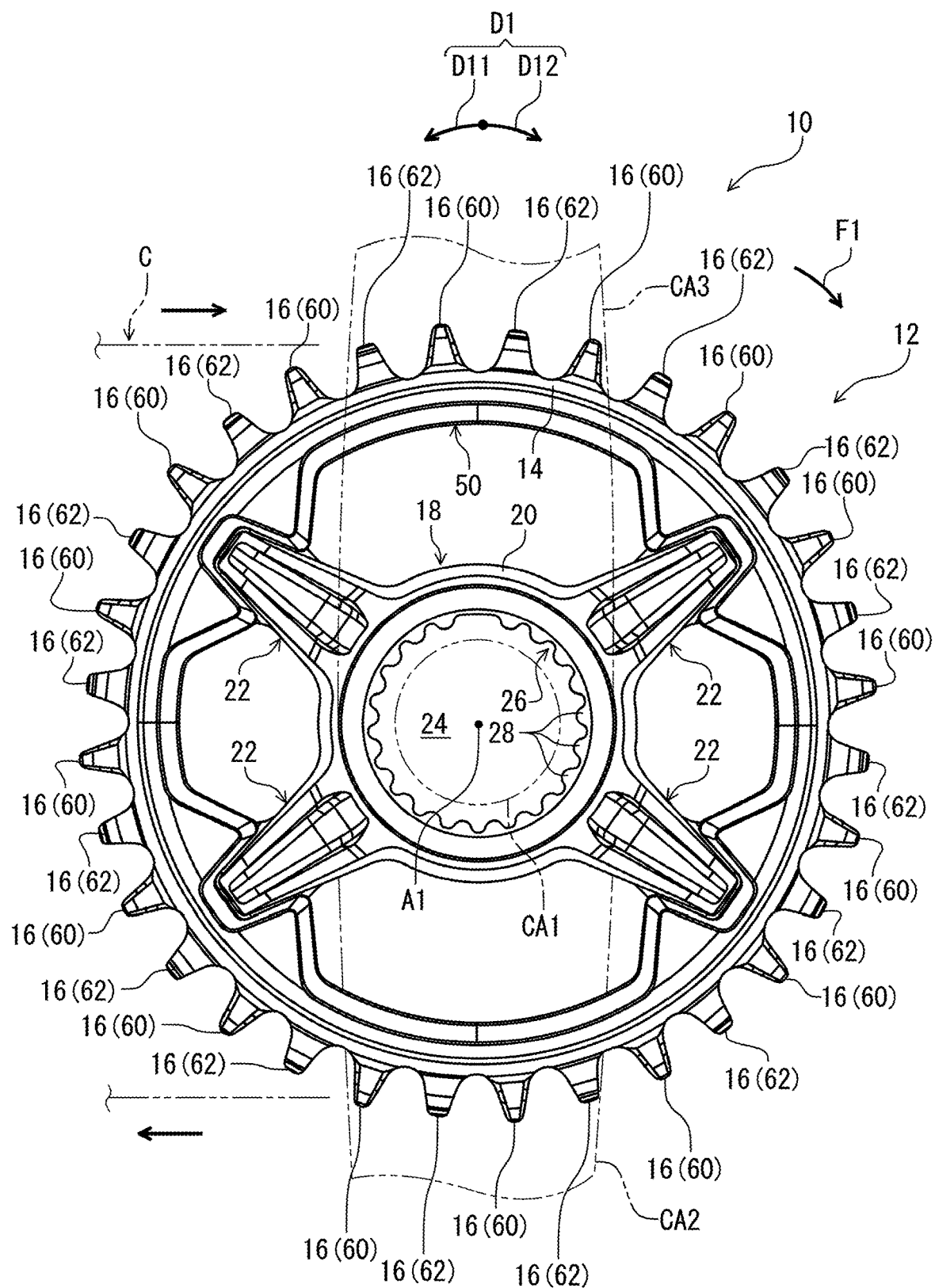
FIG. 1 is a side elevational view of a bicycle crank assembly including a bicycle sprocket in accordance with an embodiment.

The embodiment(s) will now be described with reference to the accompanying drawings, wherein like reference numerals designate corresponding or identical elements throughout the various drawings.

As seen in FIG. 1, a bicycle crank assembly 10 includes a bicycle sprocket 12 in accordance with an embodiment. The bicycle crank assembly 10 includes a crank axle CA1, a crank arm CA2, and an additional crank arm CA3. The crank arm CA2 and the additional crank arm CA3 are secured to the crank axle CA1. The bicycle sprocket 12 is directly secured to the crank arm CA2 to rotate integrally with the crank arm CA2 about a rotational center axis A1. However, the bicycle sprocket 12 can be directly secured to the crank axle CA1.

The bicycle sprocket 12 is engageable with a bicycle chain C to transmit a pedaling force F1 between the bicycle chain C and the bicycle sprocket 12. The bicycle sprocket 12 is rotated about the rotational center axis A1 in a first circumferential direction D11 during pedaling. The first circumferential direction D11 extends along a circumferential direction D1 of the bicycle sprocket 12. A second circumferential direction D12 extends along the circumferential direction D1 and is opposite to the first circumferential direction D11. In this embodiment, the bicycle sprocket 12 is a front sprocket. However, structures of the bicycle sprocket 12 can apply to a rear sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12, should be interpreted relative to the bicycle equipped with the bicycle sprocket 12 as used in an upright riding position on a horizontal surface.

As seen in FIG. 1, the bicycle sprocket 12 comprises a sprocket body 14, a plurality of sprocket teeth 16, and a mounting member 18. The plurality of sprocket teeth 16 extends radially outwardly from the sprocket body 14 with respect to the rotational center axis A1 of the bicycle sprocket 12. The mounting member 18 is configured to support the sprocket body 14 in an assembled state of the bicycle sprocket 12 and is a separate member from the crank arm CA2.

The mounting member 18 has a hub portion 20 and at least one mounting arm 22 extending radially outwardly from the hub portion 20 with respect to the rotational center axis A1. In this embodiment, the at least one mounting arm 22 includes a plurality of mounting arms 22. The plurality of mounting arms 22 extends radially outwardly from the hub portion 20. A total number of the mounting arms 22 is not limited to this embodiment. The mounting arm 22 is coupled to the sprocket body 14.

The hub portion 20 of the mounting member 18 has a central opening 24. The hub portion 20 of the mounting member 18 includes a torque transmitting profile 26 provided to the central opening 24. The torque transmitting profile 26 is configured to transmit pedaling torque between the bicycle sprocket 12 and one of the crank arm CA2 and the crank axle CA1. The torque transmitting profile 26 includes at least one spline tooth 28. In this embodiment, the torque transmitting profile 26 includes a plurality of spline teeth 28. However, a total number of the spline teeth 28 is not limited to this embodiment. The torque transmitting profile 26 can include structures other than the at least one spline tooth 28. In a modification where the bicycle sprocket 12 is provided as a rear sprocket, the torque transmitting profile 26 can be configured to transmit the pedaling torque between the bicycle sprocket 12 and a rear hub assembly. A total number of the spline teeth 28 is not limited to this embodiment.

Figure 2:
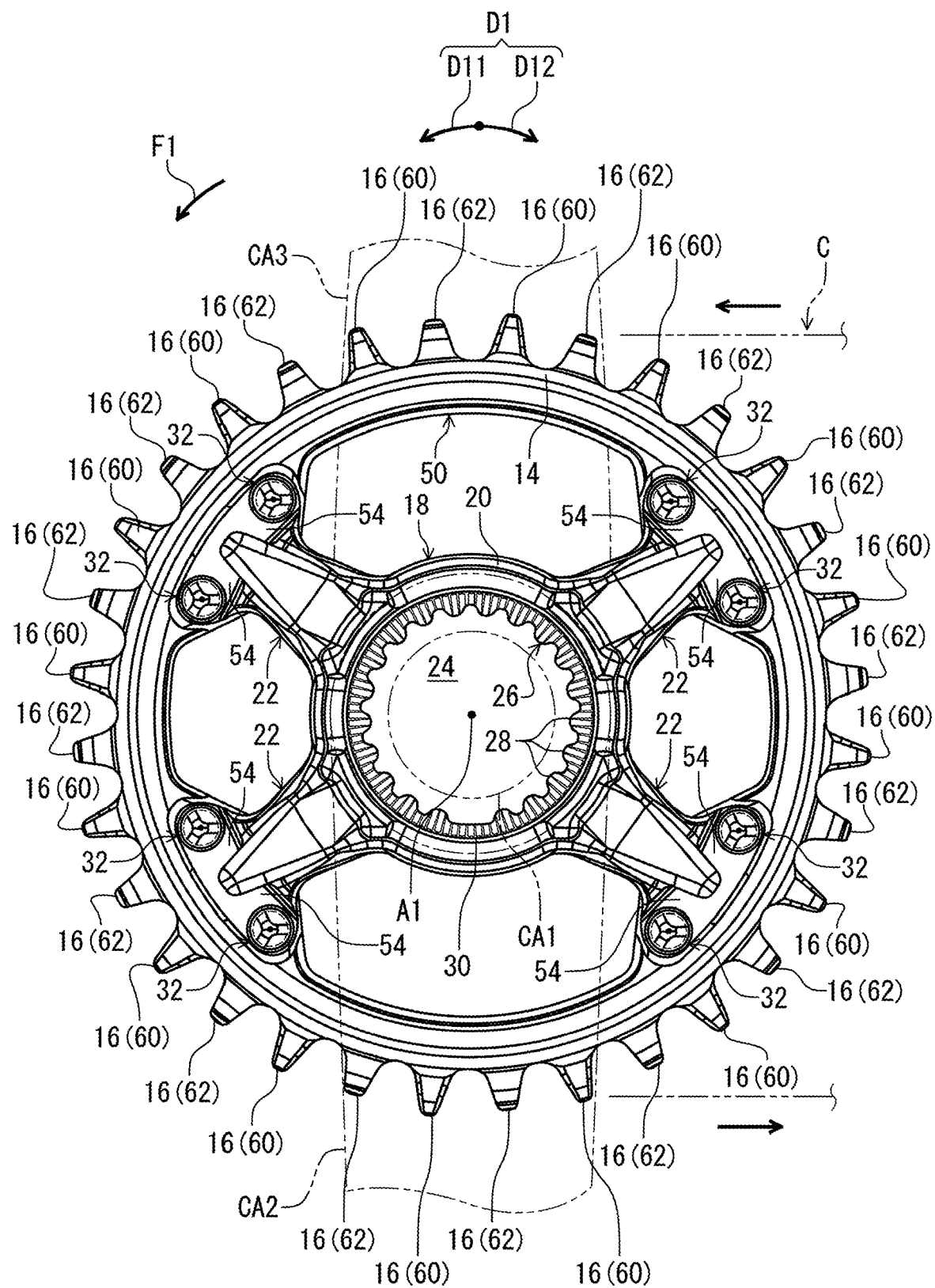
FIG. 2 is another side elevational view of the bicycle crank assembly illustrated in FIG. 1.

As seen in FIG. 2, the hub portion 20 includes a knurled portion 30 contactable with a lock member configured to secure the bicycle sprocket 12 to the crank arm CA2. The knurled portion 30 includes a serration configured to increase a rotational resistance between the hub portion 20 and the lock member.

The bicycle sprocket 12 comprises at least one fastening member 32. The mounting arm 22 is secured to the sprocket body 14 with the at least one fastening member 32. In this embodiment, the at least one fastening member 32 includes a plurality of fastening members 32. A total number of the fastening members 32 is eight. However, the total number of the fastening members 32 is not limited to this embodiment.

Figure 3:
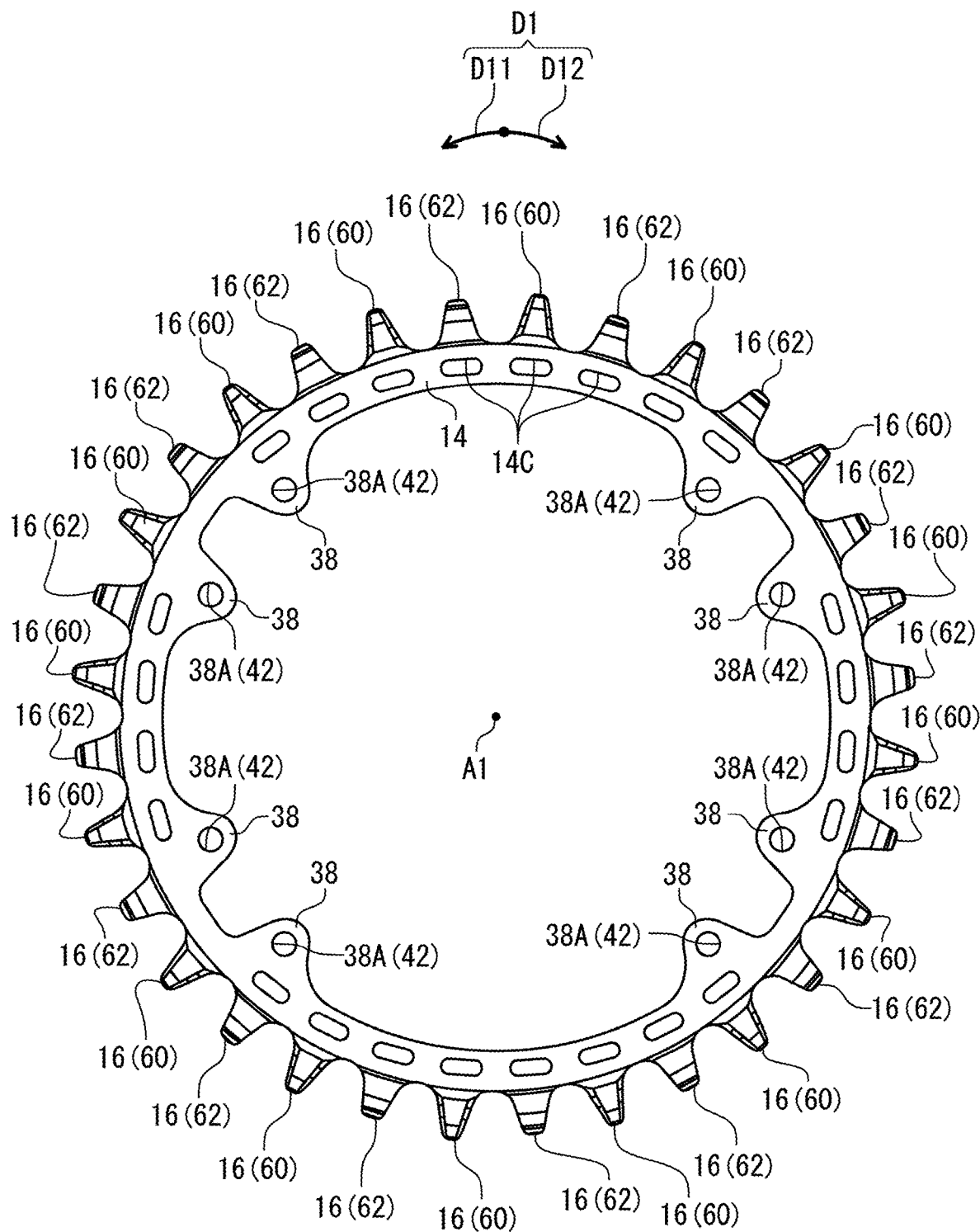
FIG. 3 is a side elevational view of a sprocket body and a plurality of sprocket teeth of the bicycle sprocket illustrated in FIG. 2.

As seen in FIG. 3, the sprocket body 14 has at least one first threaded portion 38. In this embodiment, the at least one first threaded portion 38 includes a plurality of first threaded portions 38. A total number of the first threaded portions 38 is eight. However, the total number of the first threaded portions 38 is not limited to this embodiment. The plurality of sprocket teeth 16 and the plurality of first threaded portions 38 are integrally provided with the sprocket body 14 as a one-piece unitary member. However, the plurality of sprocket teeth 16 can be a separate member from the sprocket body 14. The plurality of first threaded portions 38 can be a separate member from the sprocket body 14.

Figure 4:
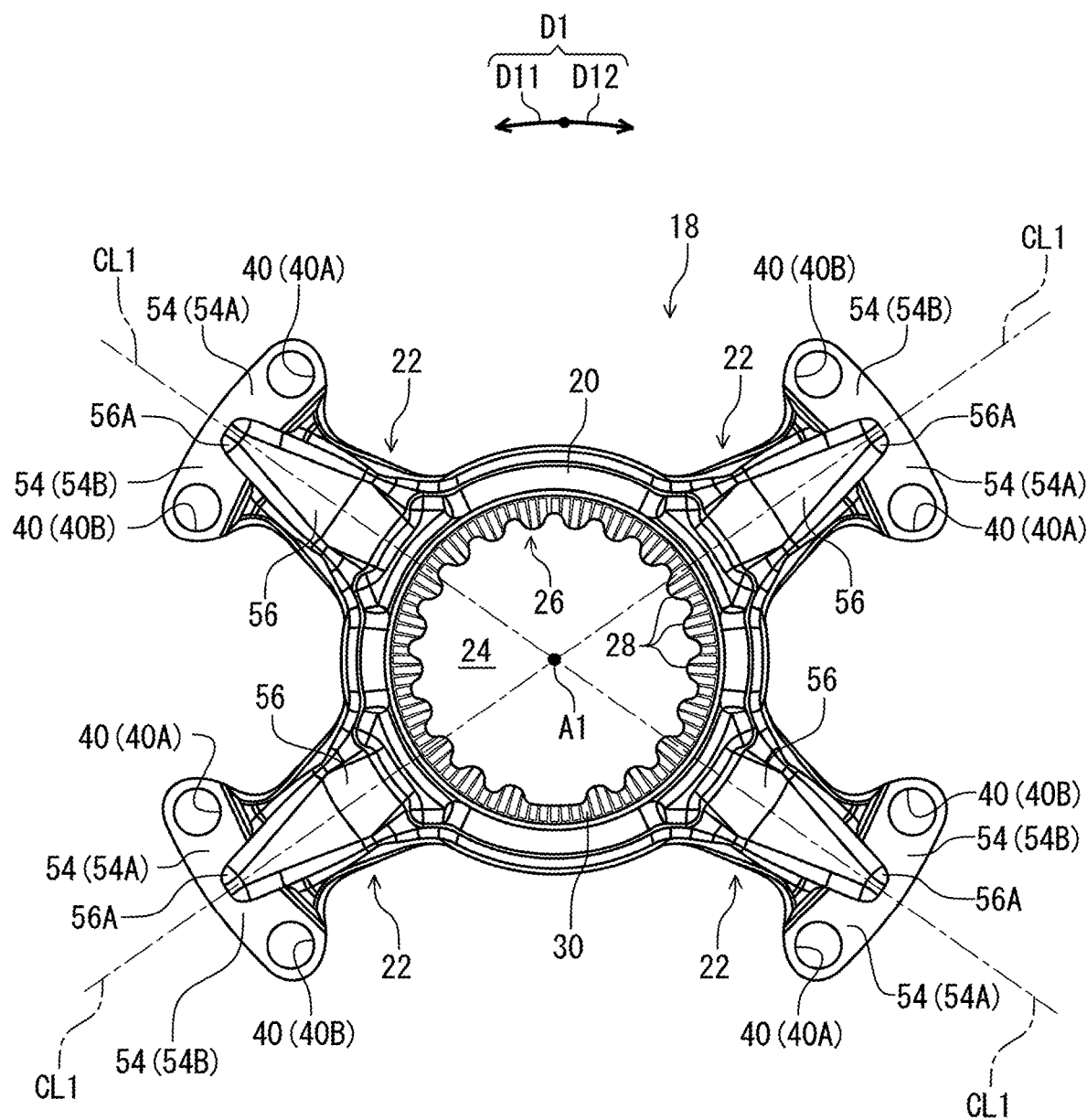
FIG. 4 is a side elevational view of a mounting member of the bicycle sprocket illustrated in FIG. 2.

As seen in FIG. 4, the mounting member 18 has at least one fastening hole 40. In this embodiment, the at least one fastening hole 40 includes a plurality of fastening holes 40. A total number of the fastening holes 40 is eight. However, the total number of the fastening holes 40 is not limited to this embodiment.

Figure 5:
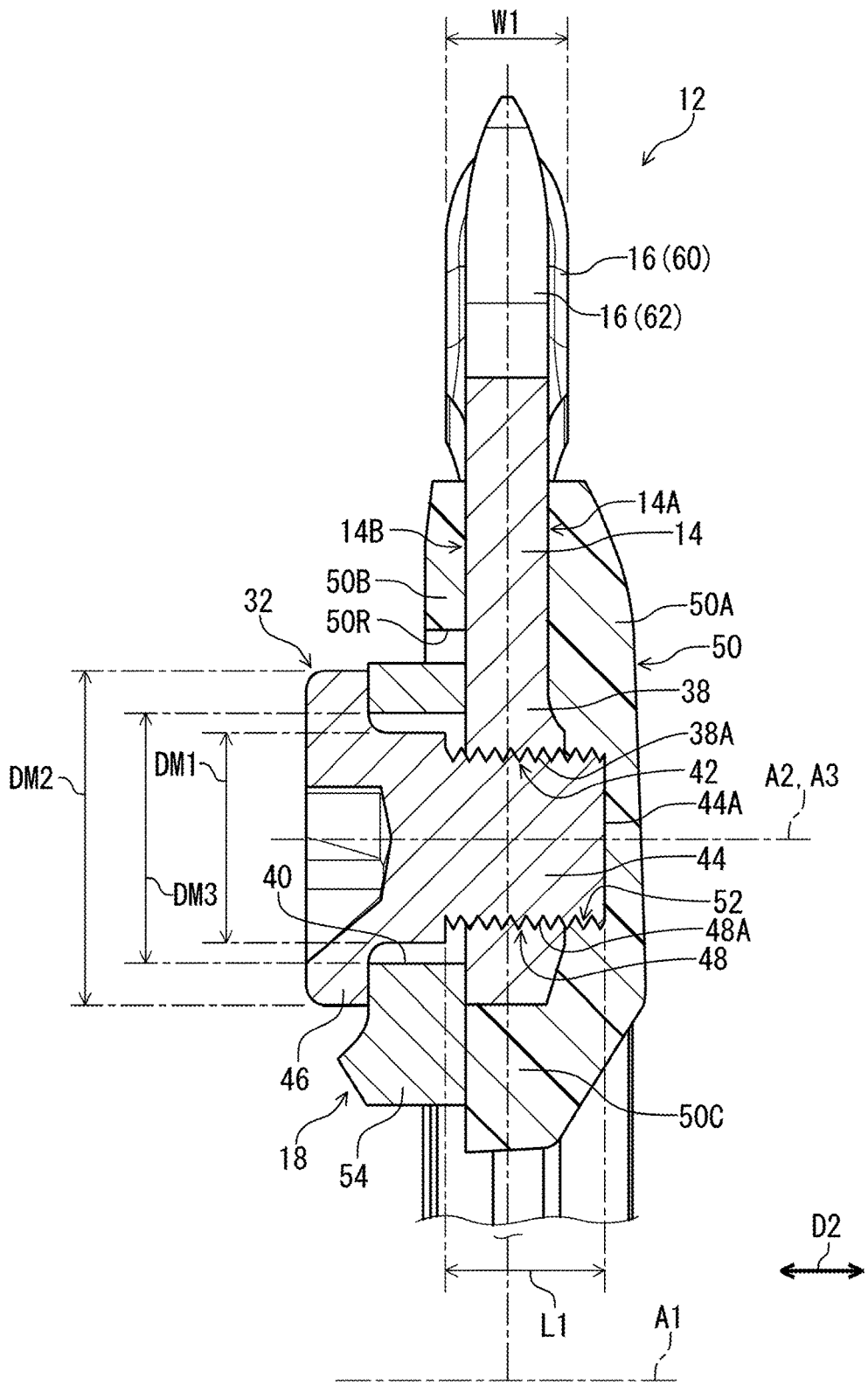
FIG. 5 is a cross-sectional view of the bicycle sprocket taken along line V-V of FIG. 9.

As seen in FIG. 5, the at least one fastening hole 40 is configured to be aligned with the at least one first threaded portion 38 in the assembled state. The at least one first threaded portion 38 includes an internal threaded portion 38A. In this embodiment, the at least one first threaded portion 38 includes a plurality of first threaded portions 38. The first threaded portion 38 includes the internal threaded portion 38A. Namely, the first threaded portion 38 includes a first threaded hole 42. The at least one fastening hole 40 includes a plurality of fastening holes 40. The fastening hole 40 is configured to be aligned with the first threaded portion 38 in the assembled state so that the first threaded hole 42 can be aligned with the fastening hole 40. In this embodiment, the first threaded portion 38 (the first threaded hole 42) has a center axis A2. The fastening hole 40 has a center axis A3. The center axis A3 of the fastening hole 40 is coincident with the center axis A2 of the first threaded portion 38. However, the fastening hole 40 can be offset from the first threaded portion 38. The center axis A3 of the fastening hole 40 can be offset from the center axis A2 of the first threaded portion 38.

The at least one fastening member 32 has a fastening shaft portion 44, a fastening head portion 46, and a second threaded portion 48. The fastening shaft portion 44 is configured to extend through the at least one fastening hole 40 of the mounting member 18 in the assembled state. The fastening head portion 46 is attached to one end of the fastening shaft portion 44. The second threaded portion 48 is provided to the fastening shaft portion 44. The second threaded portion 48 includes an external threaded portion 48A. The second threaded portion 48 is configured to threadedly engage with the at least one first threaded portion 38 of the sprocket body 14 in the assembled state.

The fastening head portion 46 is in contact with the mounting member 18 in a fastening axial direction with respect to the center axis A3 of the fastening hole 40. The mounting member 18 is provided between the sprocket body 14 and the fastening head portion 46 in an axial direction D2 with respect to the rotational center axis A1. The fastening shaft portion 44 has a first maximum outer diameter DM1. The fastening head portion 46 has a second maximum outer diameter DM2. The fastening hole 40 has a maximum inner diameter DM3. The second maximum outer diameter DM2 of the fastening head portion 46 is larger than the first maximum outer diameter DM1 of the fastening shaft portion 44. The second maximum outer diameter DM2 of the fastening head portion 46 is larger than the maximum inner diameter DM3 of the fastening hole 40. In this embodiment, the fastening head portion 46 is integrally provided with the fastening shaft portion 44 as a one-piece unitary member. However, the fastening head portion 46 can be a separate member from the fastening shaft portion 44.

The fastening shaft portion 44 includes an axial end 44A which is the farthest from the fastening head portion 46 in the fastening member 32. The sprocket body 14 includes a first surface 14A and a second surface 14B. The first surface 14A faces in the axial direction D2. The second surface 14B faces in the axial direction D2 and is provided on a reverse side of the first surface 14A in the axial direction D2. In this embodiment, the first surface 14A is provided on an axial outer side of the sprocket body 14 in the bicycle sprocket 12 in a state where the bicycle crank assembly 10 is mounted to a bicycle frame. The second surface 14B is provided on an axial inner side of the sprocket body 14 in the bicycle sprocket 12 in the state where the bicycle crank assembly 10 is mounted to the bicycle frame. The second surface 14B is closer to the bicycle frame than the first surface 14A. However, the arrangement of the first and second surfaces 14A and 14B is not limited to this embodiment.

Figure 6:
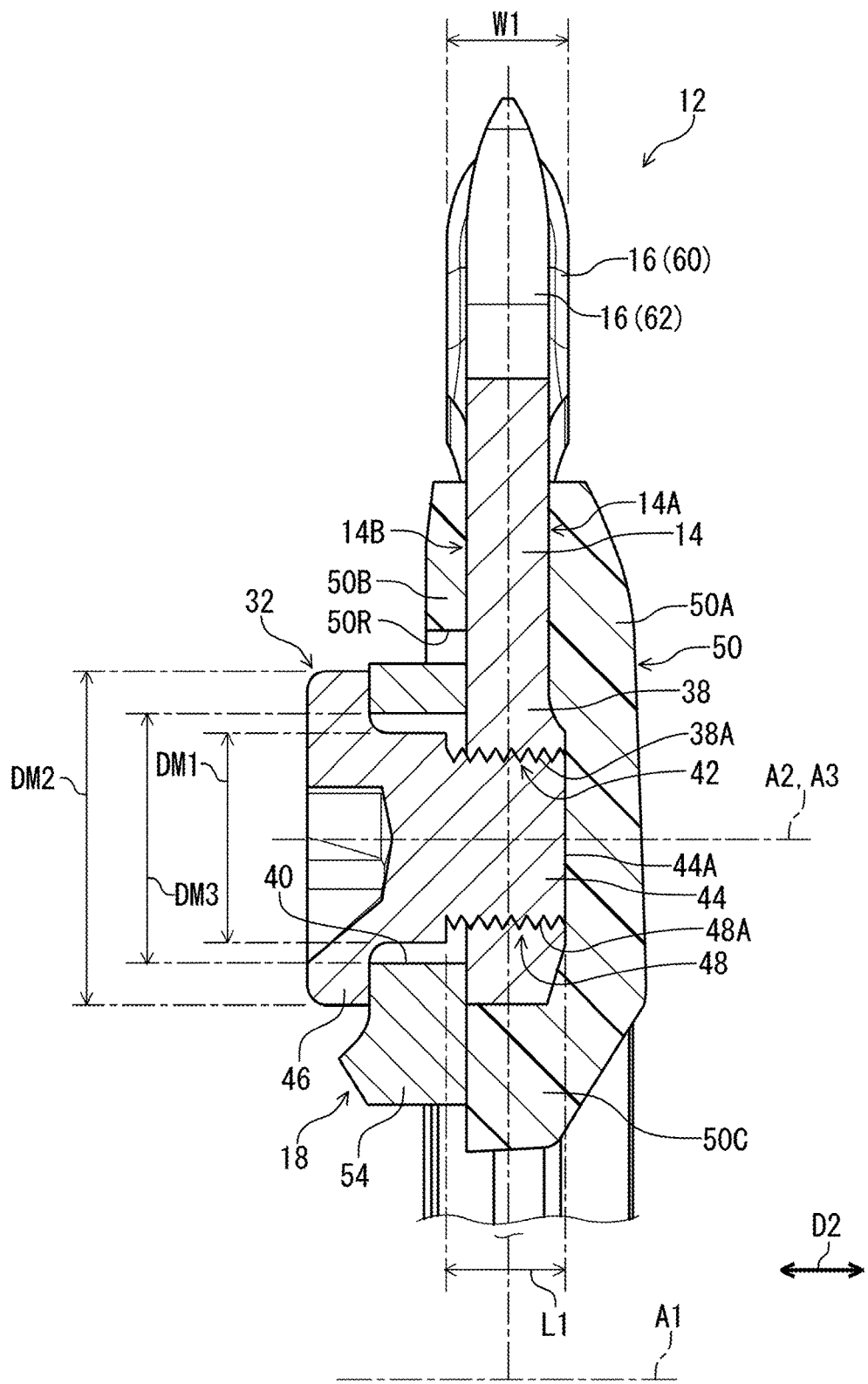
FIG. 6 is a cross-sectional view of a bicycle sprocket in accordance with a modification.
Figure 7:
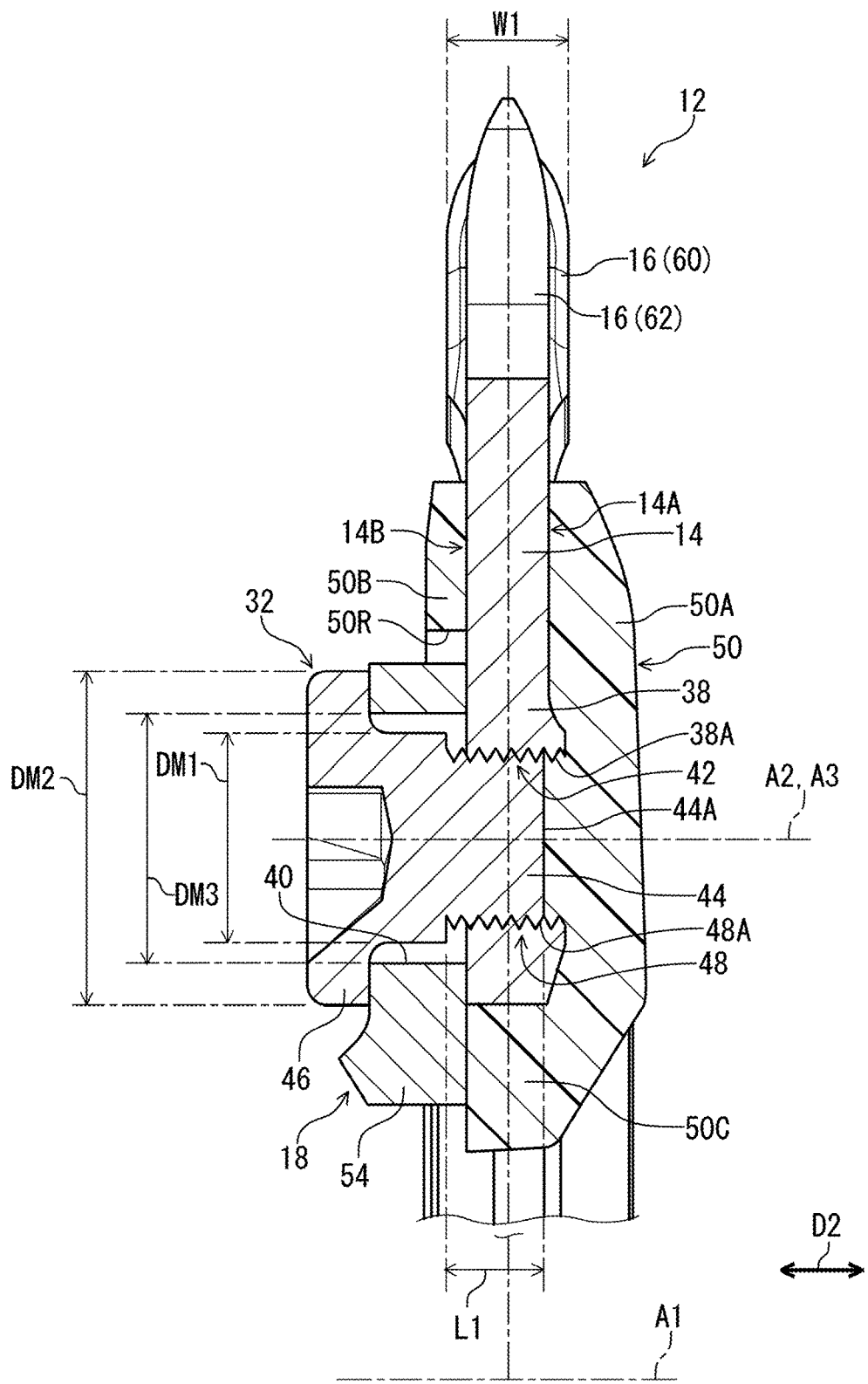
FIG. 7 is a cross-sectional view of a bicycle sprocket in accordance with another modification.

The first surface 14A is provided between the fastening head portion 46 and the axial end 44A of the fastening shaft portion 44 in the axial direction D2. The fastening shaft portion 44 protrudes from the first surface 14A in the axial direction D2. As seen in FIGS. 6 and 7, however, the axial end 44A of the fastening shaft portion 44 can be provided on the same axial position as the first surface 14A in the axial direction D2 or can be provided in the first threaded hole 42.

As seen in FIG. 5, the bicycle sprocket 12 comprises a cover member 50. The cover member 50 is attached to the sprocket body 14. The cover member 50 is attached to the sprocket body 14 with one of integral molding and adhesive. The cover member 50 is made of a non-metallic material including resin. The sprocket body 14 and the plurality of sprocket teeth 16 are made of a metallic material. In this embodiment, the cover member 50 is attached to the sprocket body 14 with the integral molding. However, the cover member 50 can be attached to the sprocket body 14 with adhesive or other attachment structures. The cover member 50 can be made of materials other than resin.

The cover member 50 includes at least one cover threaded hole 52 threadedly engaged with the second threaded portion 48. The cover threaded hole 52 is aligned with the first threaded portion 38 and the fastening hole 40. In this embodiment, the at least one cover threaded hole 52 includes a plurality of cover threaded holes 52. A total number of the cover threaded holes 52 is equal to the total number of the fastening members 32. However, the total number of the cover threaded holes 52 is not limited to this embodiment.

Figure 8:
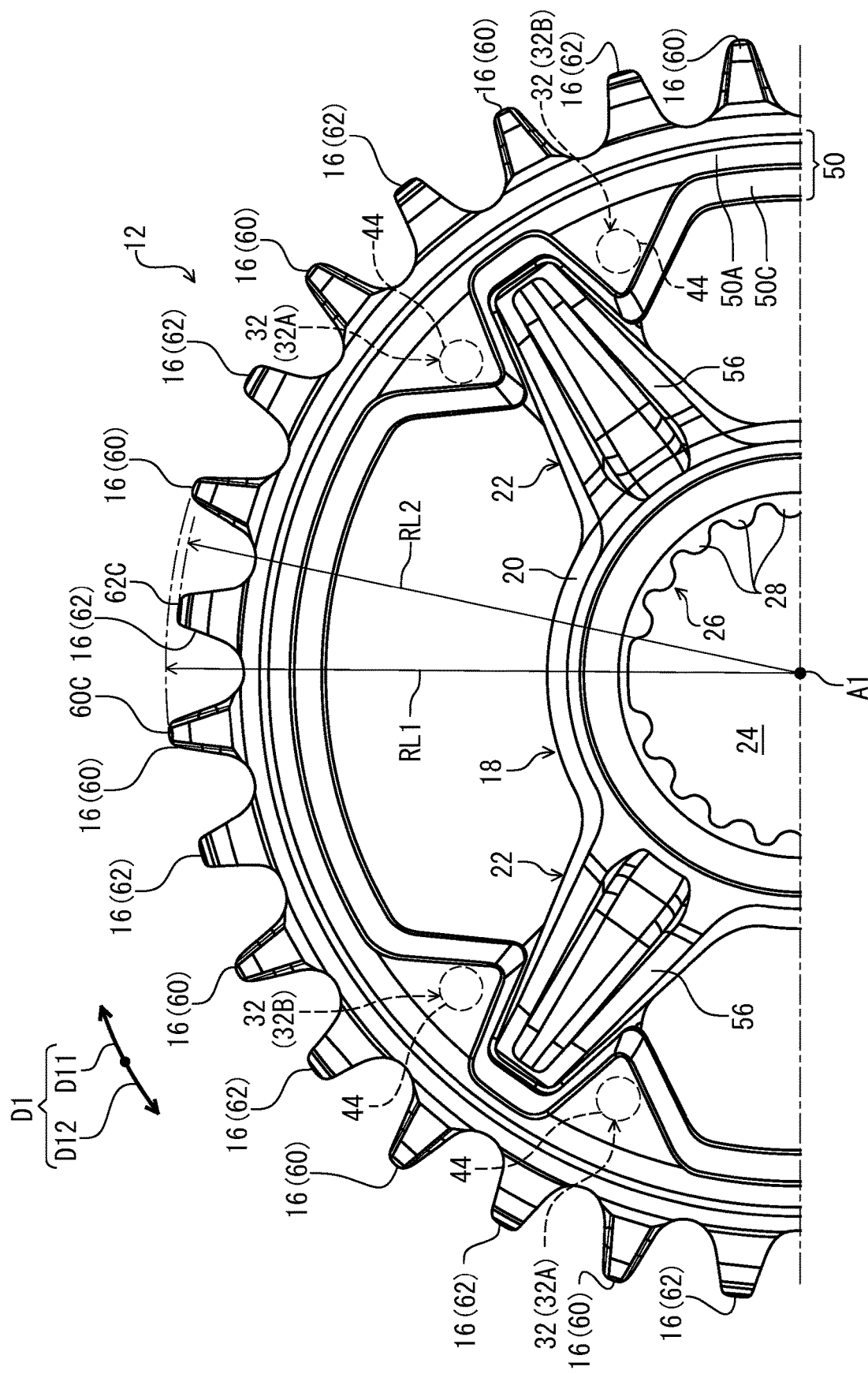
FIG. 8 is a partial side elevational view of the bicycle sprocket of the bicycle crank assembly illustrated in FIG. 1.

As seen in FIG. 8, the cover member 50 is configured to at least cover the fastening shaft portion 44 of the at least one fastening member 32 when viewed from the axial direction D2 (FIG. 5) with respect to the rotational center axis A1 in the assembled state. As seen in FIG. 5, the cover member 50 entirely covers the axial end 44A of the fastening shaft portion 44. The axial end 44A of the fastening shaft portion 44 is entirely provided inside the cover member 50.

As seen in FIG. 4, the at least one mounting arm 22 has at least one mounting portion 54 provided to a distal end of the at least one mounting arm 22. The mounting al. 22 includes an arm body 56 extending radially outwardly from the hub portion 20. The mounting portion 54 is provided at a radially outer end 56A of the arm body 56. Adjacent two mounting portions 54A and 54B are provided at the radially outer end 56A of the a m body 56.

The at least one fastening hole 40 is provided to the at least one mounting portion 54. In this embodiment, the mounting arm 22 includes a plurality of mounting portions 54. The fastening hole 40 is provided to the mounting portion 54. Namely, the mounting portion 54 includes the fastening hole 40. The adjacent two mounting portions 54A and 54B respectively include adjacent two fastening holes 40A and 40B.

A total number of the at least one mounting portion 54 is larger than a total number of the at least one mounting arm 22. The total number of the at least one mounting portion 54 is double of the total number of the at least one mounting arm 22. In this embodiment, the total number of the mounting arms 22 is four. The total number of the mounting portions 54 is eight and is equal to the total number of the fastening members 32. However, the total number of the at least one mounting portion 54 can be equal to or smaller than a total number of the at least one mounting arm 22.

Figure 9:
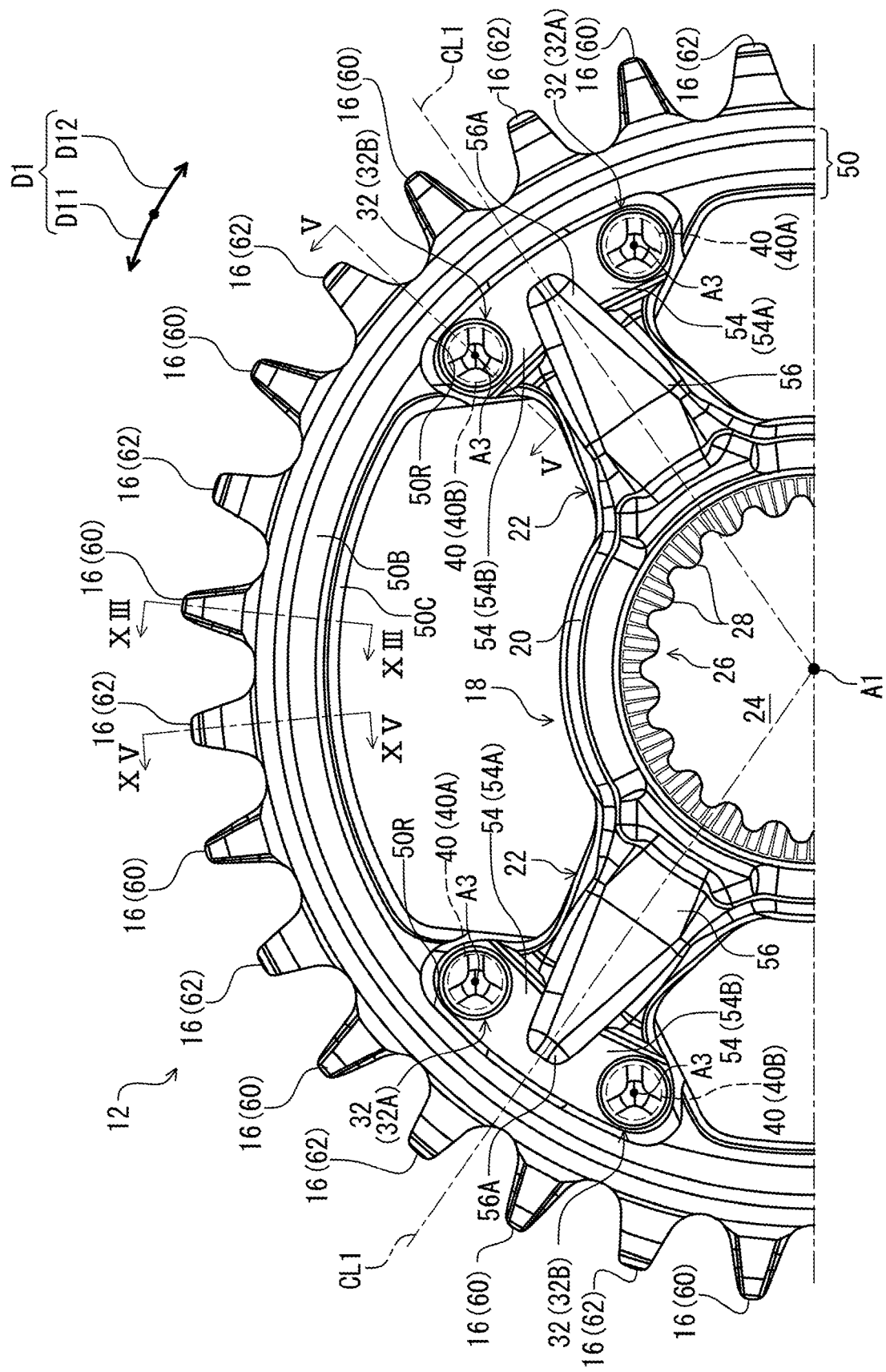
FIG. 9 is a partial side elevational view of the bicycle sprocket of the bicycle crank assembly illustrated in FIG. 2.

As seen in FIG. 9, the at least one mounting arm 22 has a radially extending centerline CL1 extending radially outwardly from the rotational center axis A1. For example, the radially extending centerline CL1 is a circumferential centerline of the arm body 56 and is provided on the radially outer end 56A of the arm body 56 when viewed along the rotational center axis A1. The at least one fastening hole 40 is offset from the radially extending centerline CL1 of the at least one mounting arm 22 in a circumferential direction with respect to the rotational center axis A1 when viewed along the rotational center axis A1. The center axis A3 of the fastening hole 40 is offset from the radially extending centerline CL1 of the at least one mounting arm 22 in the circumferential direction D1 with respect to the rotational center axis A1 when viewed along the rotational center axis A1. However, the fastening hole 40 can be provided on the radially extending centerline CL1 of the at least one mounting arm 22 when viewed along the rotational center axis A1.

The plurality of fastening holes 40 is disposed both sides of the radially extending centerline CL1 in the circumferential direction D1 when viewed along the rotational center axis A1. In this embodiment, adjacent two fastening holes 40A and 40B of the plurality of fastening holes 40 are disposed both sides of the radially extending centerline CL1 in the circumferential direction D1 when viewed along the rotational center axis A1. The radially extending centerline CL1 of the mounting arm 22 is provided between the adjacent two fastening holes 40A and 40B of the plurality of fastening holes 40 in the circumferential direction D1 when viewed along the rotational center axis A1. The radially extending centerline CL1 of the mounting arm 22 is provided between adjacent two fastening members 32A and 32B in the circumferential direction D1 when viewed along the rotational center axis A1. However, the above positional relationships are not limited to this embodiment.

As seen in FIG. 9, the cover member 50 includes at least one recess 50R. In this embodiment, the at least one recess 50R includes a plurality of recesses 50R. A total number of the recesses 50R is equal to the total number of the mounting arms 22. However, the total number of the recesses 50R is not limited to this embodiment.

Figure 10:
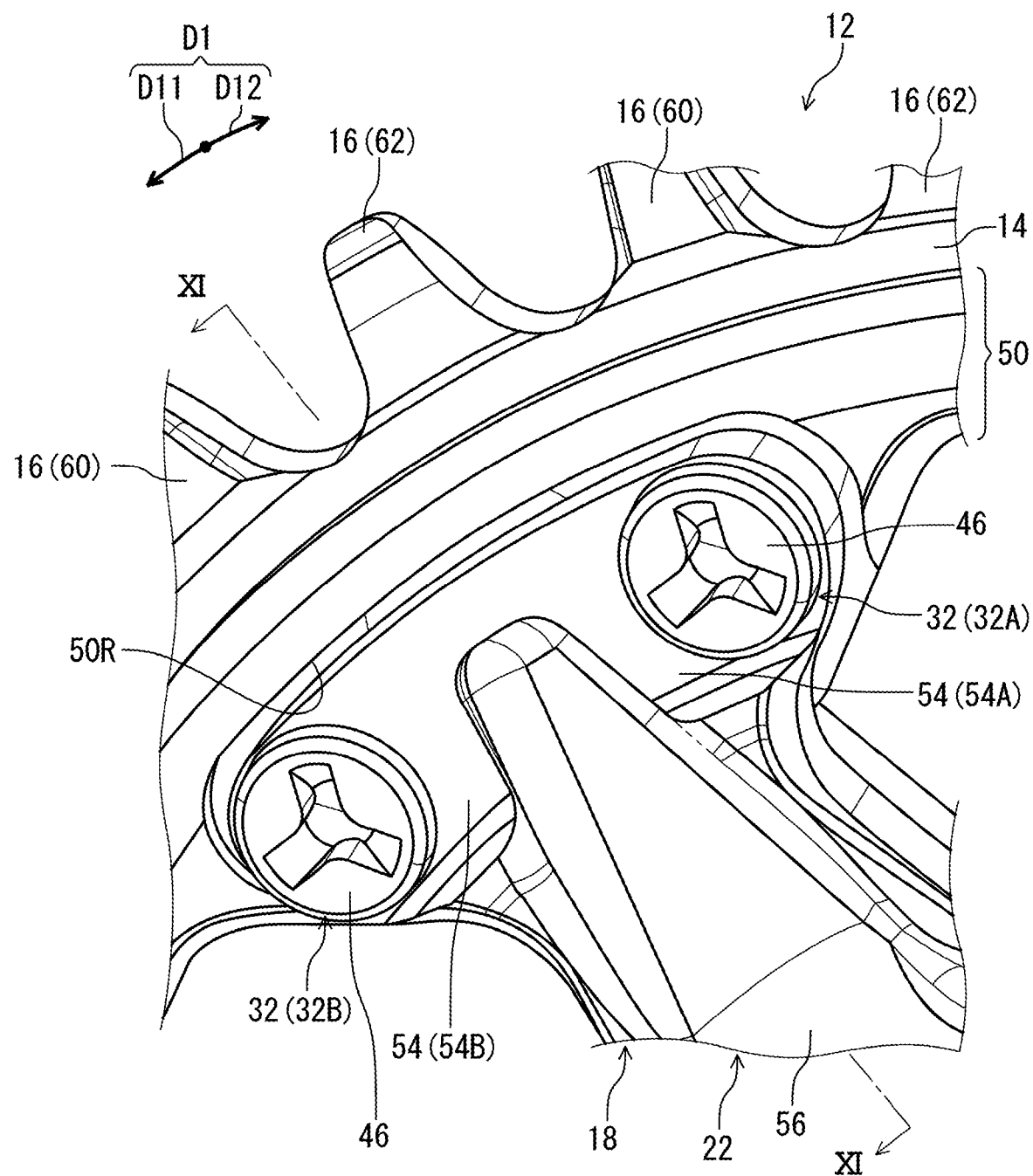
FIG. 10 is a perspective view of the bicycle sprocket of the bicycle crank assembly illustrated in FIG. 2.

As seen in FIG. 10, the mounting member 18 is partly provided in the recess 50R. In this embodiment, the adjacent two mounting portions 54A and 54B are provided in the recess 50R.

Figure 11:
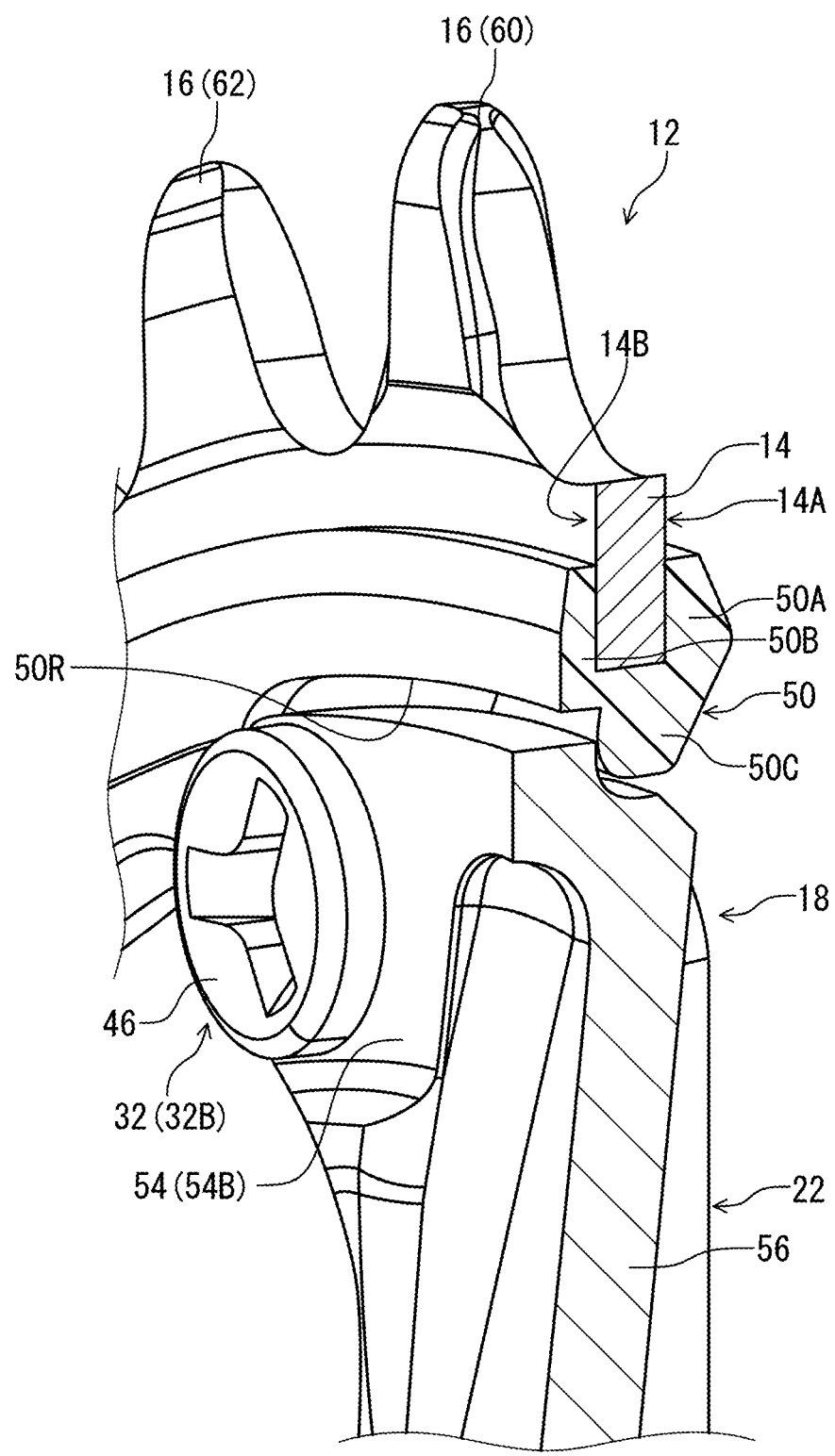
FIG. 11 is a cross-sectional view of the bicycle sprocket taken along line XI-XI of FIG. 10.
Figure 12:
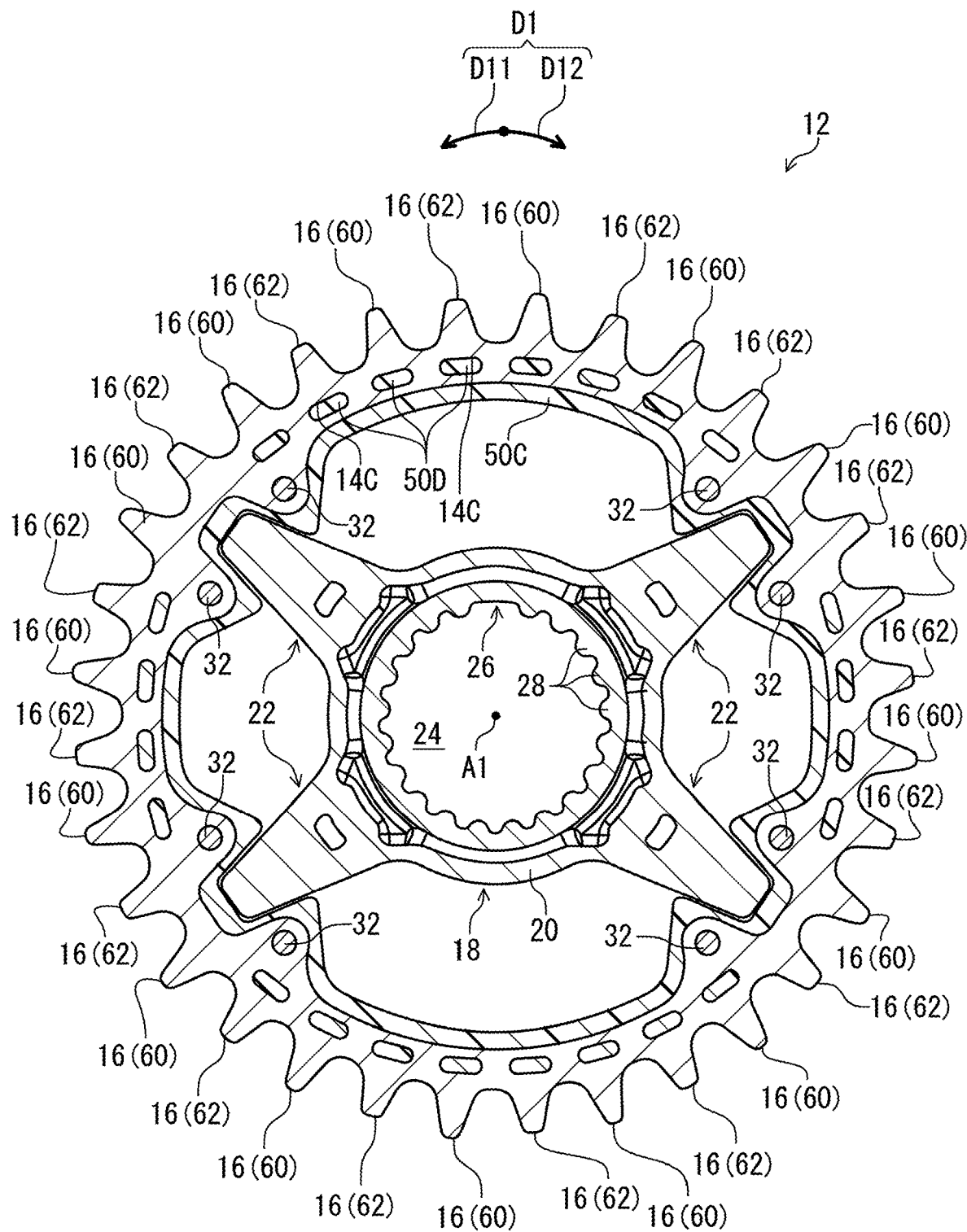
FIG. 12 is a cross-sectional view of the bicycle sprocket taken along line XII-XII of FIG. 13.

As seen in FIG. 11, the cover member 50 includes a first cover part 50A, a second cover part 50B, and a third cover part 50C. The first cover part 50A is provided on the first surface 14A of the sprocket body 14. The second cover part 50B is provided on the second surface 14B of the sprocket body 14. The second cover part 50B includes the plurality of recesses 50R. The third cover part 50C is provided between the first cover part 50A and the second cover part 50B in the axial direction D2. The third cover part 50C couples the first cover part 50A to the second cover part 50B. The third cover part 50C is at least partly provided radially inwardly of the sprocket body 14. As seen in FIG. 8, the first cover part 50A has an annular shape. As seen in FIG. 9, the second cover part 50B has an annular shape. As seen in FIG. 12, the third cover part 50C has an annular shape. The third cover part 50C entirely covers an inner periphery of the sprocket body 14. However, the third cover part 50C can partly cover the inner periphery of the sprocket body 14. The shapes of the first to third cover parts 50A to 50C are not limited to this embodiment.

Figure 13:
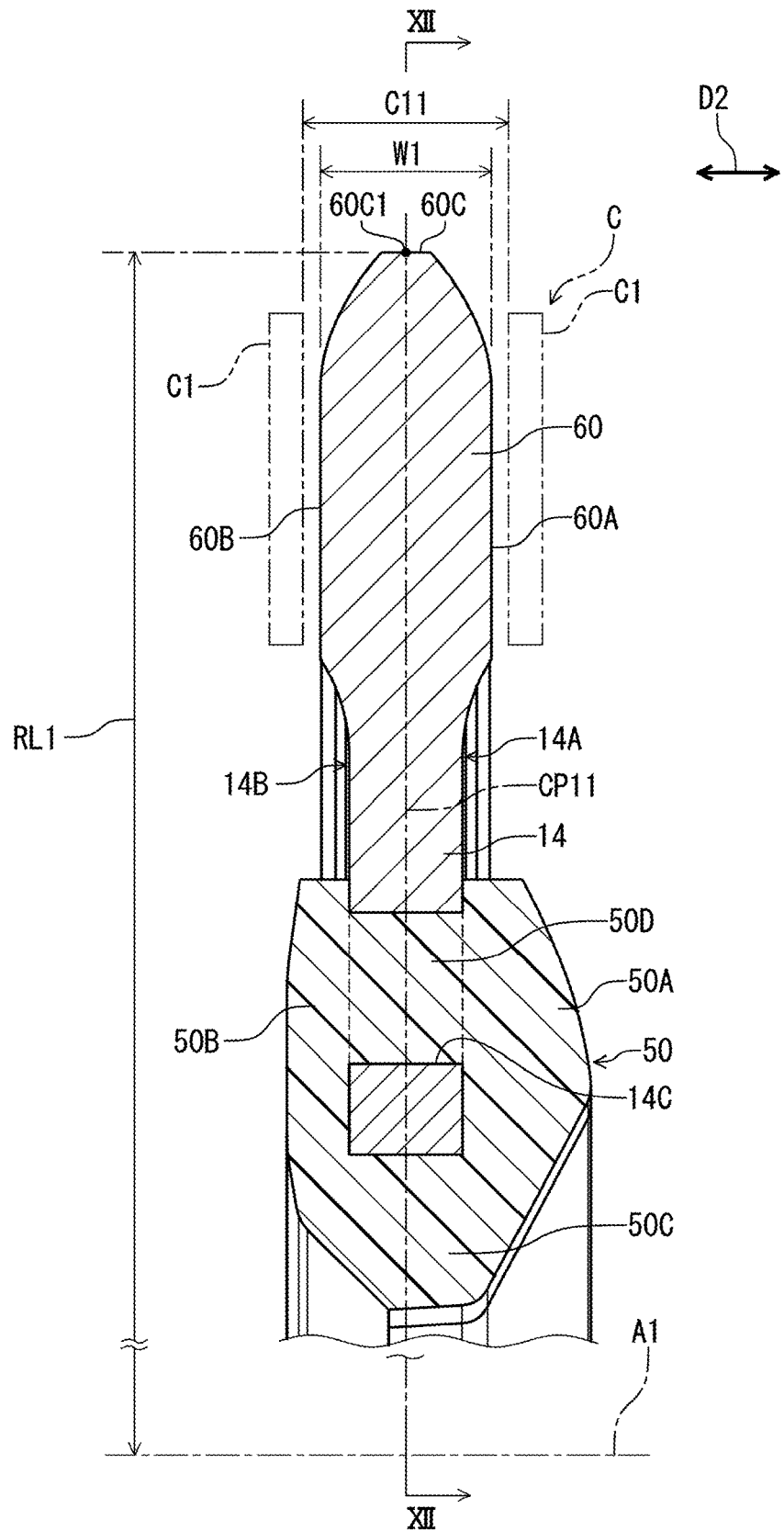
FIG. 13 is a partial cross-sectional view of the bicycle sprocket taken along line XIII-XIII of FIG. 9.
Figure 14:
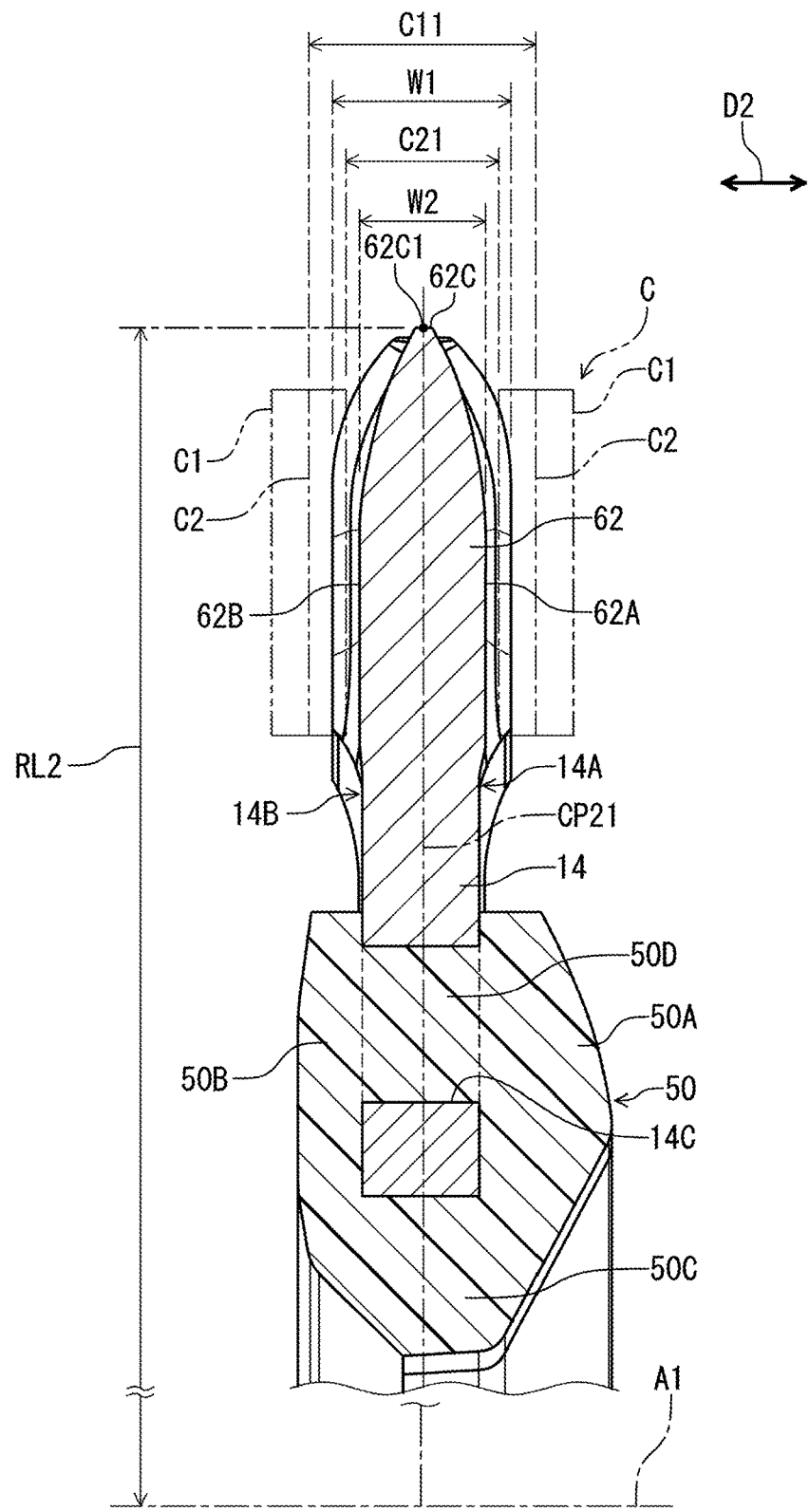
FIG. 14 is a partial cross-sectional view of the bicycle sprocket taken along line XIV-XIV of FIG. 9.

As seen in FIG. 3, the sprocket body 14 includes a plurality of openings 14C. As seen in FIGS. 13 and 14, the cover member 50 includes a plurality of intermediate parts 50D. The intermediate part 50D is provided in the opening 14C of the sprocket body 14. The plurality of intermediate parts 50D couples the first cover part 50A to the second cover part 50B.

As seen in FIG. 9, the plurality of sprocket teeth 16 includes at least one first tooth 60 and at least one second tooth 62. The plurality of sprocket teeth 16 includes a plurality of first teeth 60 and a plurality of second teeth 62. The plurality of first teeth 60 and the plurality of second teeth 62 are alternately arranged in the circumferential direction D1.

As seen in FIG. 13, the at least one first tooth 60 has a first chain-engaging axial width W1 with respect to the rotational center axis A1. The first tooth 60 includes a first axial surface 60A and a first additional axial surface 60B. The first axial surface 60A faces in the axial direction D2 to engage with one of an opposed pair of outer link plates C1 of the bicycle chain C. The first additional axial surface 60B faces in the axial direction D2 to engage with the other of the opposed pair of the outer link plates C1 of the bicycle chain C. The first additional axial surface 60B is provided on a reverse side of the first axial surface 60A in the axial direction D2. The first chain-engaging axial width W1 is defined from the first axial surface 60A to the first additional axial surface 60B in the axial direction D2.

Figure 15:
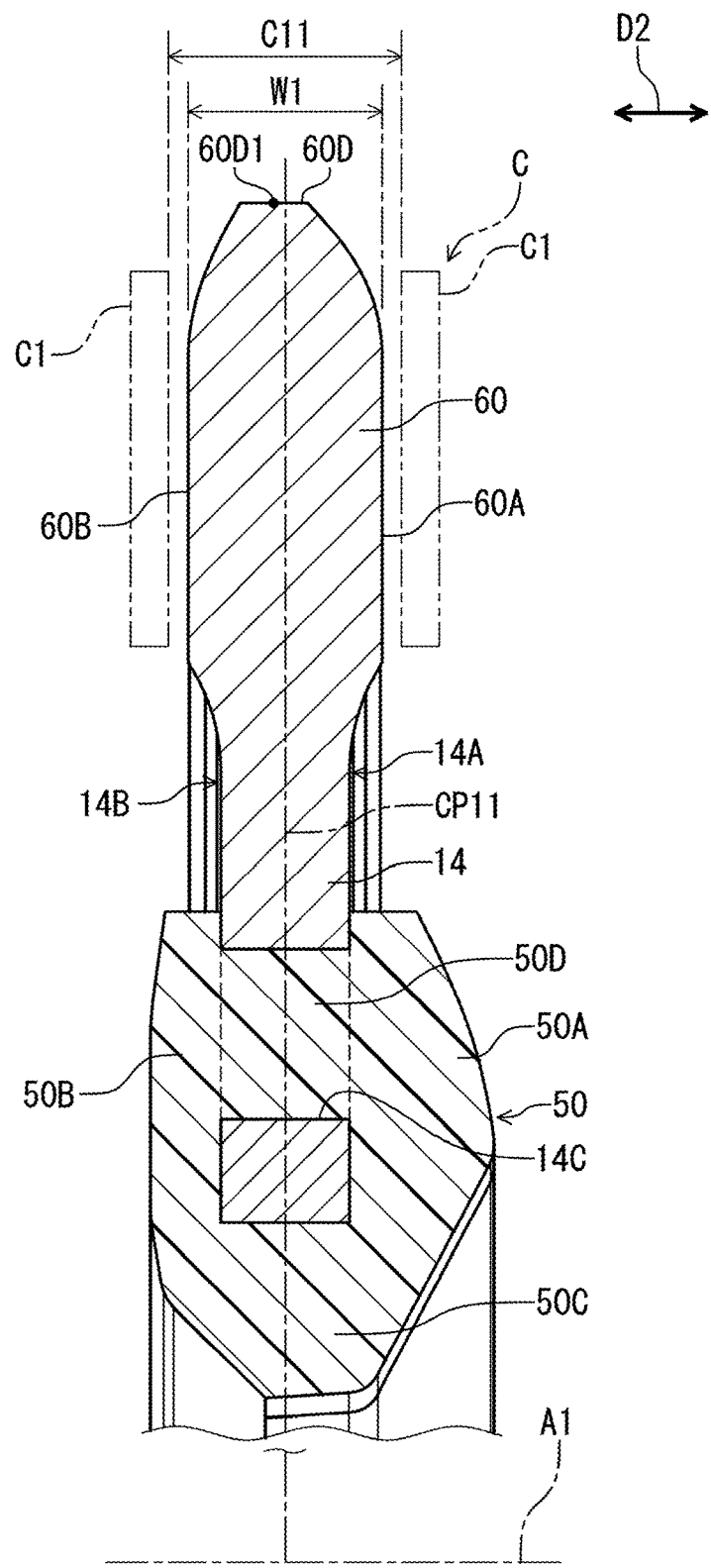
FIG. 15 is a partial cross-sectional view of a bicycle sprocket in accordance with another modification.

The at least one first tooth 60 is symmetric with respect to a first axial tooth center plane CP11 in the axial direction D2 in the embodiment illustrated in FIG. 13. The first tooth 60 includes a first radially outermost tooth-tip 60C provided the farthest from the rotational center axis A1 in the first tooth 60. A first axial tooth-center 60C1 of the first radially outermost tooth-tip 60C is provided on the first axial tooth center plane CP11. The first axial tooth center plane CP11 is defined to bisect the first chain-engaging axial width W1 in the axial direction D2 and is perpendicular to the rotational center axis A1. As seen in FIG. 15, however, the at least one first tooth 60 can be asymmetric with respect to the first axial tooth center plane CP11 in the axial direction D2. In the modification illustrated in FIG. 15, for example, the at least one first tooth 60 has a first radially outermost tooth-tip 60D having a first axial tooth-center 60D1 that is offset from the first axial tooth center plane CP11 of the at least one first tooth 60. The first axial tooth-center 60D1 of the first radially outermost tooth-tip 60D is offset from the first axial tooth center plane CP11 in the axial direction D2. The first axial tooth-center 60D1 of the first radially outermost tooth-tip 60D can be positioned to be closer to one of the first axial surface 60A and the first additional axial surface 60B than the other of the first axial surface 60A and the first additional axial surface 60B. In the embodiment illustrated in FIG. 15, the first axial tooth-center 60D1 of the first radially outermost tooth-tip 60D is positioned to be closer to the first additional axial surface 60B than the first axial surface 60A. However, the first axial tooth-center 60D1 of the first radially outermost tooth-tip 60D can be positioned to be closer to the first axial surface 60A than the first additional axial surface 60B. Thus, the at least one first tooth 60 can be asymmetric between the first axial surface 60A and the first additional axial surface 60B in the axial direction D2.

As seen in FIG. 14, the at least one second tooth 62 has a second chain-engaging axial width W2 with respect to the rotational center axis A1. The second tooth 62 includes a second axial surface 62A and a second additional axial surface 62B. The second axial surface 62A faces in the axial direction D2 to engage with one of an opposed pair of inner link plates C2 of the bicycle chain C. The second additional axial surface 62B faces in the axial direction D2 to engage with the other of the opposed pair of the inner link plates C2 of the bicycle chain C. The second additional axial surface 62B is provided on a reverse side of the second axial surface 62A in the axial direction D2. The second chain-engaging axial width W2 is defined from the second axial surface 62A to the second additional axial surface 62B in the axial direction D2.

Figure 16:
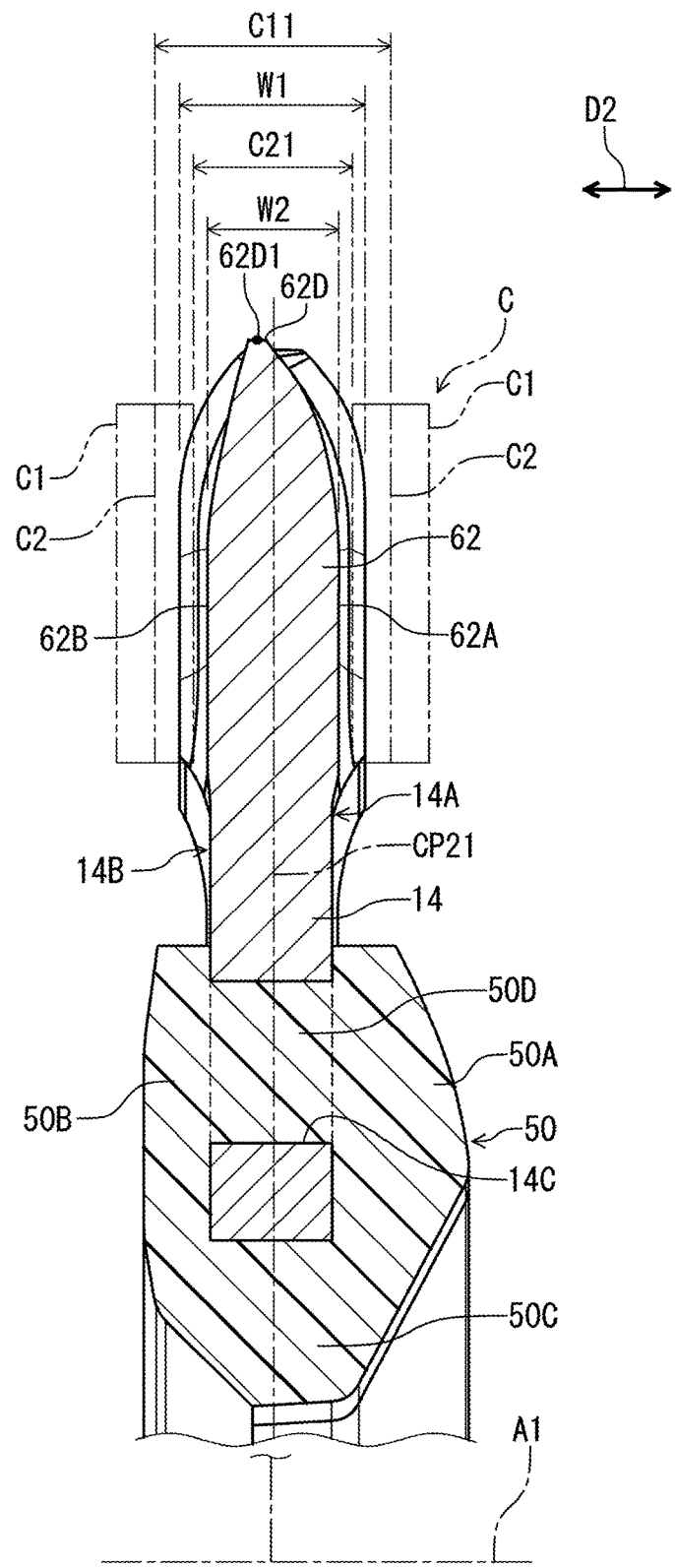
FIG. 16 is a partial cross-sectional view of the bicycle sprocket in accordance with another modification.

The at least one second tooth 62 is symmetric with respect to a second axial tooth center plane CP21 in the axial direction D2 in the embodiment illustrated in FIG. 14. The second tooth 62 includes a second radially outermost tooth-tip 62C provided the farthest from the rotational center axis A1 in the second tooth 62. A second axial tooth-center 62C1 of the second radially outermost tooth-tip 62C is provided on the second axial tooth center plane CP21. The second axial tooth center plane CP21 is defined to bisect the second chain-engaging axial width W2 in the axial direction D2 and is perpendicular to the rotational center axis A1. As seen in FIG. 16, however, the at least one second tooth 62 can be asymmetric with respect to the second axial tooth center plane CP21 in the axial direction D2. In the modification illustrated in FIG. 16, for example, the at least one second tooth 62 has a second radially outermost tooth-tip 62D having a second axial tooth-center 62D1 that is offset from a second axial tooth center plane CP21 of the at least one second tooth 62. The second axial tooth-center 62D1 of the second radially outermost tooth-tip 62D is offset from the second axial tooth center plane CP21 in the axial direction D2. The second axial tooth-center 62D1 of the second radially outermost tooth-tip 62D can be positioned to be closer to one of the second axial surface 62A and the second additional axial surface 62B than the other of the second axial surface 62A and the second additional axial surface 62B. In the embodiment illustrated in FIG. 16, the second axial tooth-center 62D1 of the second radially outermost tooth-tip 62D is positioned to be closer to the second additional axial surface 62B than the second axial surface 62A. However, the second axial tooth-center 62D1 of the second radially outermost tooth-tip 62D can be positioned to be closer to the second axial surface 62A than the second additional axial surface 62B. Thus, the at least one second tooth 62 can be asymmetric between the second axial surface 62A and the second additional axial surface 62B in the axial direction D2. The second axial tooth center plane CP21 is defined to bisect the second chain-engaging axial width W2 in the axial direction D2 and is perpendicular to the rotational center axis A1.

As seen in FIG. 14, the first chain-engaging axial width W1 is larger than the second chain-engaging axial width W2 in the axial direction D2. The first chain-engaging axial width W1 is larger than an inner link axial space C21 defined between the opposed pair of inner link plates C2 of the bicycle chain C in the axial direction D2. The first chain-engaging axial width W1 is smaller than an outer link axial space C11 defined between the opposed pair of outer link plates C1 of the bicycle chain C in the axial direction D2. The second chain-engaging axial width W2 is smaller than the inner link axial space C21. The first chain-engaging axial width W1 of the at least one first tooth 60 is equal to or larger than 75% of the outer link axial space C11. However, the dimensional relationship among the first chain-engaging axial width W1, the second chain-engaging axial width W2, the outer link axial space C11, and the inner link axial space C21 is not limited to this embodiment. The first chain-engaging axial width W1 of the at least one first tooth 60 can be smaller than 75% of the outer link axial space C11.

As seen in FIG. 5, an axial length L1 of the first threaded portion 38 is larger than the first chain-engaging axial width W1. However, the axial length L1 of the first threaded portion 38 can be equal to or smaller than the first chain-engaging axial width W1. In the modification illustrated in FIG. 6, the axial length L1 of the first threaded portion 38 is equal to the first chain-engaging axial width W1. In the modification illustrated in FIG. 7, the axial length L1 of the first threaded portion 38 is smaller than the first chain-engaging axial width W1.

As seen in FIG. 13, a first radial length RL1 is defined between the first radially outermost tooth-tip 60C of the at least one first tooth 60 and the rotational center axis A1 in a radial direction with respect to the rotational center axis A1. As seen in FIG. 14, a second radial length RL2 is defined between the second radially outermost tooth-tip 62C of the at least one second tooth 62 and the rotational center axis A1 in the radial direction. As seen in FIG. 8, the first radial length RL1 is larger than the second radial length RL2. However, the first radial length RL1 can be equal to or smaller than the second radial length RL2.

Figure 17:
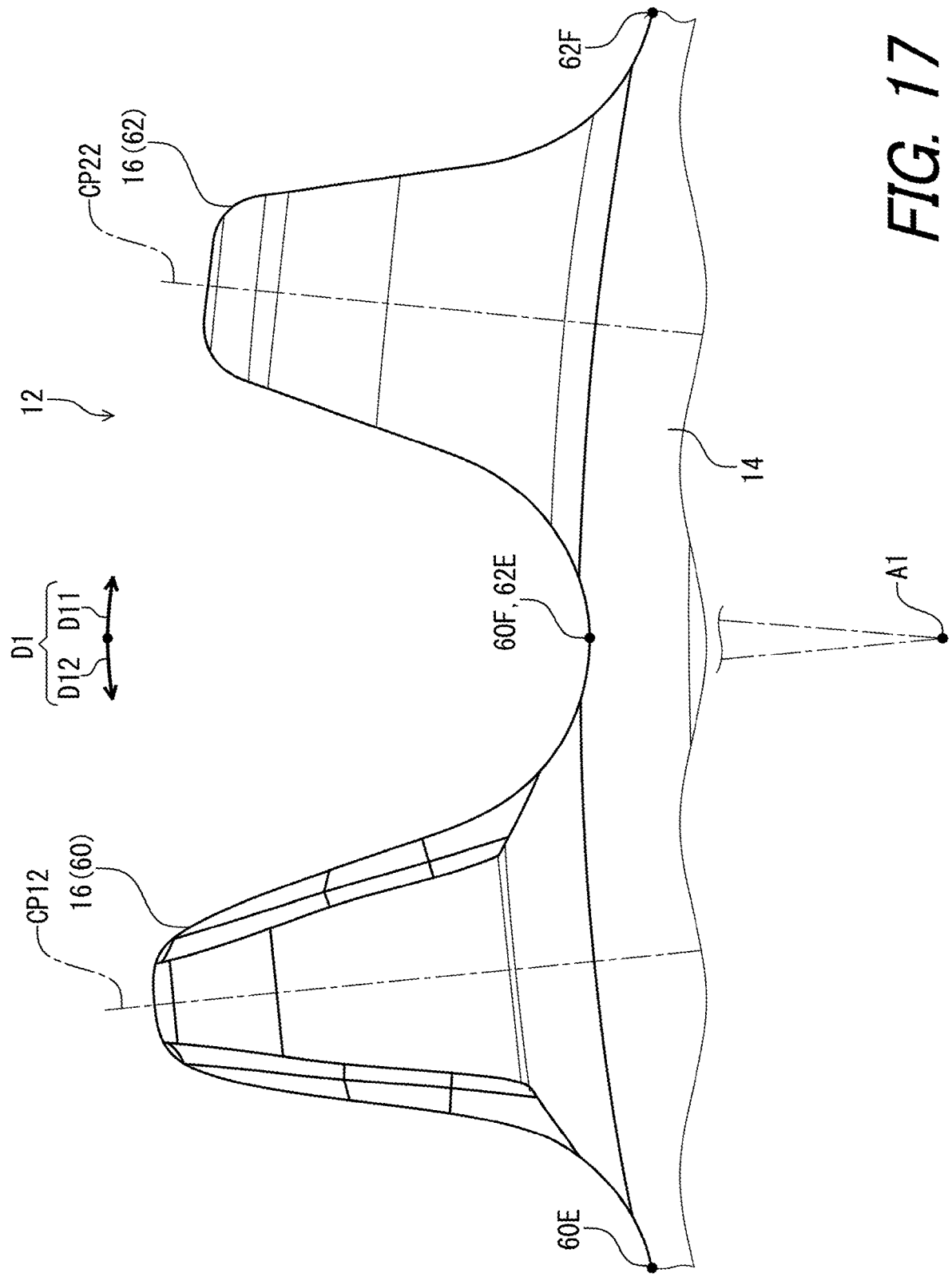
FIG. 17 is a partial side elevational view of the bicycle sprocket of the bicycle crank assembly illustrated in FIG. 1.
Figure 18:
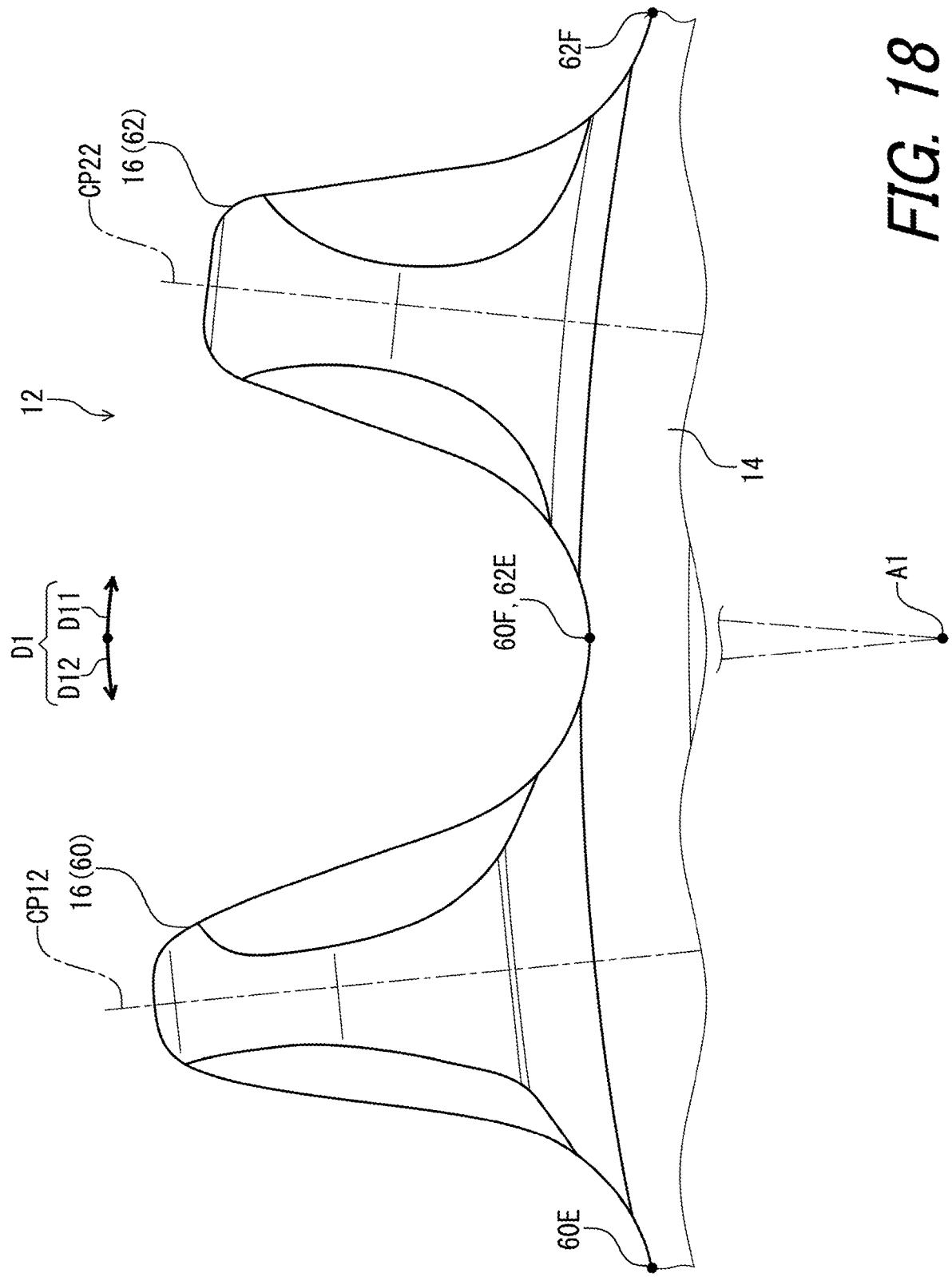
FIG. 18 is a partial side elevational view of a bicycle sprocket in accordance with another modification.

As seen in FIG. 17, the at least one first tooth 60 is symmetric with respect to a first circumferential tooth center plane CP12 in the circumferential direction with respect to the rotational center axis A1. The first circumferential tooth center plane CP12 extends radially outwardly from the rotational center axis A1. The first circumferential tooth center plane CP12 is provided at a circumferential center between tooth bottoms 60E and 60F of the first tooth 60 in the circumferential direction D1. As seen in FIG. 18, however, the at least one first tooth 60 can be asymmetric with respect to the first circumferential tooth center plane CP12 in the circumferential direction with respect to the rotational center axis A1.

As seen in FIG. 17, the at least one second tooth 62 is symmetric with respect to a second circumferential tooth center plane CP22 in the circumferential direction D1 with respect to the rotational center axis A1. The second circumferential tooth center plane CP22 extends radially outwardly from the rotational center axis A1. The second circumferential tooth center plane CP22 is provided at a circumferential center between tooth bottoms 62E and 62F of the second tooth 62 in the circumferential direction D1. As seen in FIG. 18, however, the at least one second tooth 62 can be asymmetric with respect to the second circumferential tooth center plane CP22 in the circumferential direction D1 with respect to the rotational center axis A1.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body having at least one first threaded portion;
a plurality of sprocket teeth extending radially outwardly from the sprocket body with respect to a rotational center axis of the bicycle sprocket;
a mounting member configured to support the sprocket body in an assembled state of the bicycle sprocket and being a separate member from a crank arm, the mounting member having at least one fastening hole configured to be aligned with the at least one first threaded portion in the assembled state;
at least one fastening member having a fastening shaft portion configured to extend through the at least one fastening hole of the mounting member in the assembled state, a fastening head portion attached to one end of the fastening shaft portion, and a second threaded portion provided to the fastening shaft portion, the second threaded portion being configured to threadedly engage with the at least one first threaded portion of the sprocket body in the assembled state; and
a cover member configured to at least cover the fastening shaft portion of the at least one fastening member when viewed from an axial direction with respect to the rotational center axis in the assembled state, wherein
the at least one first threaded portion is integrally formed with the sprocket body as a one-piece unitary member.

2. The bicycle sprocket according to claim 1, wherein the at least one first threaded portion includes an internal threaded portion.

3. The bicycle sprocket according to claim 2, wherein the second threaded portion includes an external threaded portion.

4. The bicycle sprocket according to claim 1, wherein the cover member is attached to the sprocket body.

5. The bicycle sprocket according to claim 4, wherein the cover member is attached to the sprocket body with one of integral molding and adhesive.

6. The bicycle sprocket according to claim 1, wherein the cover member is made of a non-metallic material including resin.

7. The bicycle sprocket according to claim 1, wherein the mounting member has a hub portion and at least one mounting arm extending radially outwardly from the hub portion with respect to the rotational center axis.

8. The bicycle sprocket according to claim 7, wherein the at least one mounting arm includes a plurality of mounting arms.

9. The bicycle sprocket according to claim 7, wherein the at least one mounting arm has at least one mounting portion provided to a distal end of the at least one mounting arm, and
the at least one fastening hole is provided to the at least one mounting portion.

10. The bicycle sprocket according to claim 9, wherein a total number of the at least one mounting portion is larger than a total number of the at least one mounting arm.

11. The bicycle sprocket according to claim 10, wherein the total number of the at least one mounting portion is double of the total number of the at least one mounting arm.

12. The bicycle sprocket according to claim 7, wherein the at least one mounting arm has a radially extending centerline extending radially outwardly from the rotational center axis, and
the at least one fastening hole is offset from the radially extending centerline of the at least one mounting arm in a circumferential direction with respect to the rotational center axis when viewed along the rotational center axis.

13. The bicycle sprocket according to claim 12, wherein the at least one fastening hole includes a plurality of fastening holes, and
the plurality of fastening holes is disposed both sides of the radially extending centerline in the circumferential direction.

14. The bicycle sprocket according to claim 7, wherein the hub portion of the mounting member has a central opening.

15. The bicycle sprocket according to claim 14, wherein the hub portion of the mounting member includes a torque transmitting profile provided to the central opening.

16. The bicycle sprocket according to claim 15, wherein the torque transmitting profile includes at least one spline tooth.

17. The bicycle sprocket according to claim 15, wherein the torque transmitting profile is configured to transmit pedaling torque between the bicycle sprocket and one of the crank arm and a crank axle.

18. The bicycle sprocket according to claim 1, wherein the plurality of sprocket teeth includes at least one first tooth having a first chain-engaging axial width with respect to the rotational center axis and at least one second tooth having a second chain-engaging axial width with respect to the rotational center axis, and the first chain-engaging axial width is larger than the second chain-engaging axial width in the axial direction.

19. The bicycle sprocket according to claim 18, wherein the first chain-engaging axial width is larger than an inner link axial space defined between an opposed pair of inner link plates of a bicycle chain in the axial direction and is smaller than an outer link axial space defined between an opposed pair of outer link plates of the bicycle chain in the axial direction, and the second chain-engaging axial width is smaller than the inner link axial space.

20. The bicycle sprocket according to claim 18, wherein a first radial length is defined between a first radially outermost tooth-tip of the at least one first tooth and the rotational center axis in a radial direction with respect to the rotational center axis, a second radial length is defined between a second radially outermost tooth-tip of the at least one second tooth and the rotational center axis in the radial direction, and the first radial length is larger than the second radial length.

21. The bicycle sprocket according to claim 18, wherein the at least one first tooth has a first radially outermost tooth-tip having a first axial tooth-center that is offset from a first axial tooth center plane of the at least one first tooth.

22. The bicycle sprocket according to claim 18, wherein the at least one second tooth has a second radially outermost tooth-tip having a second axial tooth-center that is offset from a second axial tooth center plane of the at least one second tooth.

23. The bicycle sprocket according to claim 18, wherein the at least one first tooth is asymmetric with respect to a first circumferential tooth center plane in a circumferential direction with respect to the rotational center axis.

24. The bicycle sprocket according to claim 18, wherein the at least one first tooth is asymmetric with respect to a first axial tooth center plane in the axial direction.

25. The bicycle sprocket according to claim 1, wherein the sprocket body including the at least one first threaded portion are integrally provided with the plurality of sprocket teeth as a one-piece unitary member.

26. A bicycle sprocket comprising:
a sprocket body having at least one first threaded portion;
a plurality of sprocket teeth extending radially outwardly from the sprocket body with respect to a rotational center axis of the bicycle sprocket;
a mounting member configured to support the sprocket body in an assembled state of the bicycle sprocket and being a separate member from a crank arm, the mounting member having at least one fastening hole configured to be aligned with the at least one first threaded portion in the assembled state;
at least one fastening member having a fastening shaft portion configured to extend through the at least one fastening hole of the mounting member in the assembled state, a fastening head portion attached to one end of the fastening shaft portion, and a second threaded portion provided to the fastening shaft portion, the second threaded portion being configured to threadedly engage with the at least one first threaded portion of the sprocket body in the assembled state; and
a cover member configured to at least cover the fastening shaft portion of the at least one fastening member when viewed from an axial direction with respect to the rotational center axis in the assembled state, wherein
the plurality of sprocket teeth includes at least one first tooth having a first chain-engaging axial width with respect to the rotational center axis and at least one second tooth having a second chain-engaging axial width with respect to the rotational center axis,
the first chain-engaging axial width is larger than the second chain-engaging axial width in the axial direction,
the first chain-engaging axial width is larger than an inner link axial space defined between an opposed pair of inner link plates of a bicycle chain in the axial direction and is smaller than an outer link axial space defined between an opposed pair of outer link plates of the bicycle chain in the axial direction,
the second chain-engaging axial width is smaller than the inner link axial space,
the first chain-engaging axial width of the at least one first tooth is equal to or larger than 75% of the outer link axial space, and
the at least one first threaded portion of the sprocket body is integrally formed with the plurality of sprocket teeth as a one-piece unitary member.

27. A bicycle sprocket comprising:
a sprocket body having at least one first threaded portion;
a plurality of sprocket teeth extending radially outwardly from the sprocket body with respect to a rotational center axis of the bicycle sprocket;
a mounting member configured to support the sprocket body in an assembled state of the bicycle sprocket and being a separate member from a crank arm, the mounting member having at least one fastening hole configured to be aligned with the at least one first threaded portion in the assembled state;
at least one fastening member having a fastening shaft portion configured to extend through the at least one fastening hole of the mounting member in the assembled state, a fastening head portion attached to one end of the fastening shaft portion, and a second threaded portion provided to the fastening shaft portion, the second threaded portion being configured to threadedly engage with the at least one first threaded portion of the sprocket body in the assembled state; and
a cover member configured to at least cover the fastening shaft portion of the at least one fastening member when viewed from an axial direction with respect to the rotational center axis in the assembled state, wherein
the plurality of sprocket teeth includes at least one first tooth having a first chain-engaging axial width with respect to the rotational center axis and at least one second tooth having a second chain-engaging axial width with respect to the rotational center axis, the first chain-engaging axial width is larger than the second chain-engaging axial width in the axial direction, the at least one first tooth is symmetric with respect to a first circumferential tooth center plane in a circumferential direction with respect to the rotational center axis, and the at least one first threaded portion of the sprocket body is integrally formed with the plurality of sprocket teeth as a one-piece unitary member.

28. A bicycle sprocket comprising:

a sprocket body having at least one first threaded portion;

a plurality of sprocket teeth extending radially outwardly from the sprocket body with respect to a rotational center axis of the bicycle sprocket;

a mounting member configured to support the sprocket body in an assembled state of the bicycle sprocket and being a separate member from a crank arm, the mounting member having at least one fastening hole configured to be aligned with the at least one first threaded portion in the assembled state;

at least one fastening member having a fastening shaft portion configured to extend through the at least one fastening hole of the mounting member in the assembled state, a fastening head portion attached to one end of the fastening shaft portion, and a second threaded portion provided to the fastening shaft portion, the second threaded portion being configured to threadedly engage with the at least one first threaded portion of the sprocket body in the assembled state; and a cover member configured to at least cover the fastening shaft portion of the at least one fastening member when viewed from an axial direction with respect to the rotational center axis in the assembled state, wherein the plurality of sprocket teeth includes at least one first tooth having a first chain-engaging axial width with respect to the rotational center axis and at least one second tooth having a second chain-engaging axial width with respect to the rotational center axis, the first chain-engaging axial width is larger than the second chain-engaging axial width in the axial direction, and the at least one first tooth is symmetric with respect to a first axial tooth center plane in the axial direction, the at least one first threaded portion of the sprocket body is integrally formed with the plurality of sprocket teeth as a one-piece unitary member.

* * * * *